US012270518B2

(12) United States Patent
Chen

(10) Patent No.: US 12,270,518 B2
(45) Date of Patent: *Apr. 8, 2025

(54) TANGLE-RESISTANT DECORATIVE LIGHTING ASSEMBLY

(71) Applicant: Willis Electric Co., Ltd., Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,661

(22) Filed: Feb. 7, 2024

(65) Prior Publication Data

US 2024/0294856 A1 Sep. 5, 2024

Related U.S. Application Data

(63) Continuation of application No. 18/465,679, filed on Sep. 12, 2023, which is a continuation of application (Continued)

(51) Int. Cl.
*F21S 4/10* (2016.01)
*C11D 7/50* (2006.01)
(Continued)

(52) U.S. Cl.
CPC .............. *F21S 4/15* (2016.01); *C11D 7/5018* (2013.01); *C11D 7/5022* (2013.01); (Continued)

(58) Field of Classification Search
None
See application file for complete search history.

(56) References Cited

U.S. PATENT DOCUMENTS 7,351,092 B2 * 4/2008 Tseng ........................ F21S 4/10 439/418
11,808,418 B2 11/2023 Chen
(Continued)

OTHER PUBLICATIONS

Office Action for U.S. Appl. No. 18/486,865, mailed May 9, 2024, Inventor: Johnny Chen (9 pages).

*Primary Examiner* — Tho D Ta
(74) *Attorney, Agent, or Firm* — Christensen, Fonder, Dardi & Herbert PLLC; John P. Ponder

(57) ABSTRACT

A tangle-resistant decorative lighting assembly, comprising: a main portion including a plurality of wires and connectors, including first and second connectors and first and second lighted-extension portions extending transversely from the main portion. The first lighted extension portion including: a first connector configured to detachably connect to the first connector of the main portion, a first plurality of wires connected to the first connector, and a first plurality of lamp assemblies connected to the first plurality of wires. The second lighted-extension portion including: a second connector configured to detachably connect to the second connector of the main portion, a second plurality of wires connected to the second connector, and a second plurality of lamp assemblies connected to the second plurality of wires. The first connector of the main portion comprises a lock portion configured to engage with a lock portion of the first connector of the first lighted-extension portion.

20 Claims, 23 Drawing Sheets

Related U.S. Application Data

No. 17/394,041, filed on Aug. 4, 2021, now Pat. No. 11,578,842, which is a continuation of application No. 16/872,607, filed on May 12, 2020, now Pat. No. 11,085,595, which is a continuation of application No. 16/178,175, filed on Nov. 1, 2018, now Pat. No. 10,718,475, which is a continuation of application No. 15/813,011, filed on Nov. 14, 2017, now Pat. No. 10,119,664, which is a continuation of application No. 15/335,197, filed on Oct. 26, 2016, now Pat. No. 9,845,925, said application No. 16/178,175 is a continuation-in-part of application No. 15/588,114, filed on May 5, 2017, now Pat. No. 10,222,037, which is a continuation of application No. 14/886,344, filed on Oct. 19, 2015, now Pat. No. 9,671,097, which is a continuation of application No. 14/627,427, filed on Feb. 20, 2015, now Pat. No. 9,243,788, which is a continuation of application No. 14/485,911, filed on Sep. 15, 2014, now Pat. No. 9,140,438, which is a continuation-in-part of application No. 14/328,221, filed on Jul. 10, 2014, now Pat. No. 9,157,588, said application No. 16/872,607 is a continuation-in-part of application No. 16/368,681, filed on Mar. 28, 2019, now Pat. No. 10,711,954, and a continuation of application No. 15/333,535, filed on Oct. 25, 2016, now Pat. No. 10,267,464, and a continuation-in-part of application No. 16/751,056, filed on Jan. 23, 2020, now abandoned, which is a continuation of application No. 16/241,745, filed on Jan. 7, 2019, now Pat. No. 10,578,289, which is a continuation of application No. 15/588,114, filed on May 5, 2017, now Pat. No. 10,222,037, which is a continuation of application No. 14/886,344, filed on Oct. 19, 2015, now Pat. No. 9,671,097, which is a continuation of application No. 14/627,427, filed on Feb. 20, 2015, now Pat. No. 9,243,788, which is a continuation of application No. 14/485,911, filed on Sep. 15, 2014, now Pat. No. 9,140,438, which is a continuation-in-part of application No. 14/328,221, filed on Jul. 10, 2014, now Pat. No. 9,157,588.

(60) Provisional application No. 62/246,423, filed on Oct. 26, 2015, provisional application No. 61/877,854, filed on Sep. 13, 2013.

(51) Int. Cl.

| | |
|---|---|
| ***F21S 4/15*** | (2016.01) |
| ***F21V 23/00*** | (2015.01) |
| ***F21V 23/06*** | (2006.01) |
| ***H01R 13/627*** | (2006.01) |
| ***H01R 25/00*** | (2006.01) |
| *F21W 121/00* | (2006.01) |

(52) U.S. Cl.

CPC ............ *F21V 23/001* (2013.01); *F21V 23/06* (2013.01); *H01R 13/627* (2013.01); *H01R 25/003* (2013.01); *C11D 2111/16* (2024.01); *F21S 4/10* (2016.01); *F21W 2121/00* (2013.01); *F21W 2121/006* (2013.01)

(56) References Cited

U.S. PATENT DOCUMENTS

| | | | | |
|---|---|---|---|---|
| 11,920,750 B2 * | 3/2024 | Chen | .................... | H01R 13/627 |
| 2010/0089614 A1 * | 4/2010 | Debladis | .............. | H01B 7/1895<br>174/126.4 |

* cited by examiner

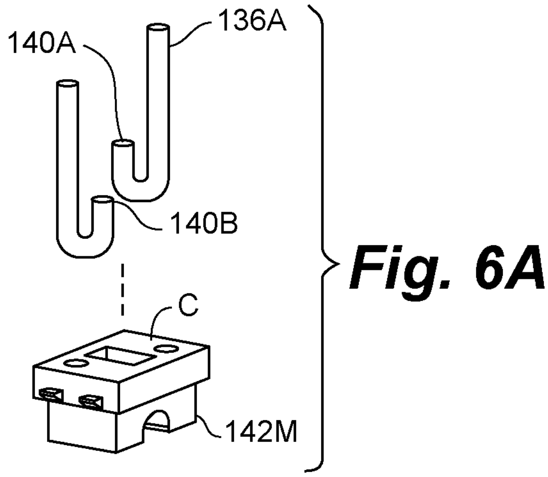
Fig. 6A
Fig. 6B
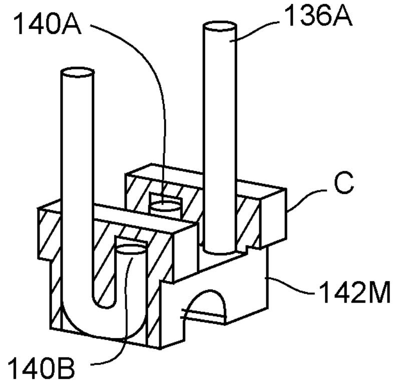
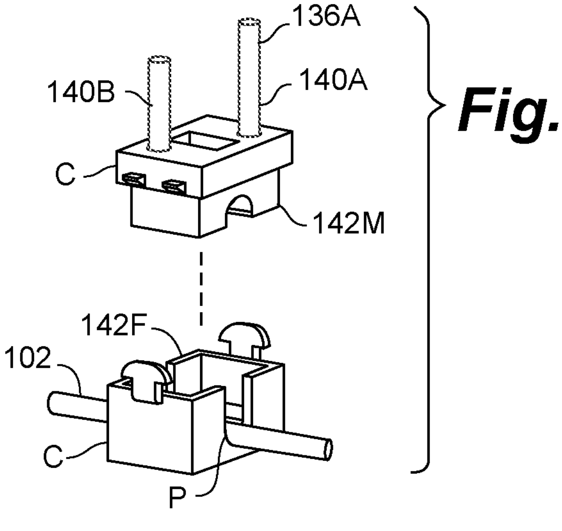
Fig. 6C
Fig. 6D
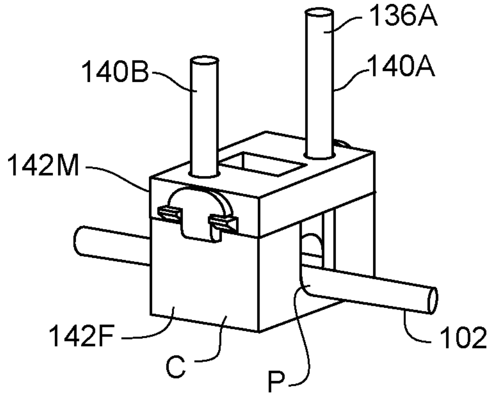

TANGLE-RESISTANT DECORATIVE LIGHTING ASSEMBLY

RELATED APPLICATIONS

The present application is a continuation of U.S. patent application Ser. No. 18/165,679, filed Feb. 7, 2023, which is a continuation of U.S. patent application Ser. No. 17/394,041, filed Aug. 4, 2021, which is a continuation of U.S. patent application Ser. No. 16/872,607, filed May 12, 2020, now U.S. Pat. No. 11,085,595, which is a continuation of U.S. patent application Ser. No. 16/178,175, filed Nov. 1, 2018, now U.S. Pat. No. 10,718,475, which is a continuation of U.S. patent application Ser. No. 15/813,011, filed Nov. 14, 2017, now U.S. Pat. No. 10,119,664, which is a continuation of U.S. patent application Ser. No. 15/335,197, filed Oct. 26, 2016, now U.S. Pat. No. 9,845,925, which claims the benefit of U.S. Provisional Application No. 62/246,423, filed Oct. 26, 2015, the contents of which are incorporated herein by reference in their entireties.

U.S. patent application Ser. No. 16/178,175, filed Nov. 1, 2018, is also a continuation-in-part of U.S. patent application Ser. No. 15/588,114, filed May 5, 2017, now U.S. Pat. No. 10,222,037, which is a continuation of Ser. No. 14/886,344, filed Oct. 19, 2015, now U.S. Pat. No. 9,671,097, which is a continuation of Ser. No. 14/627,427, filed Feb. 20, 2015, now U.S. Pat. No. 9,243,788, which is a continuation of U.S. application Ser. No. 14/485,911, filed Sep. 15, 2014, now U.S. Pat. No. 9,140,438, which is a continuation-in-part of U.S. application Ser. No. 14/328,221, filed Jul. 10, 2014, now U.S. Pat. No. 9,157,588, which claims the benefit of 61/877,854, filed Sep. 13, 2013, the contents of which are incorporated herein by reference in their entireties.

U.S. patent application Ser. No. 16/872,607, filed May 12, 2020, is also a continuation-in-part of U.S. Ser. No. 16/368,681, filed Mar. 28, 2019, now U.S. Pat. No. 10,711,954, which is a continuation of U.S. patent application Ser. No. 15/333,535, filed Oct. 25, 2016, now U.S. Pat. No. 10,267,464, which claims the benefit of U.S. Provisional Application No. 62/246,423, filed Oct. 26, 2015, the contents of which are incorporated herein by reference in their entireties.

U.S. patent application Ser. No. 16/872,607, filed May 12, 2020, is also a continuation-in-part of U.S. patent application Ser. No. 16/751,056, filed Jan. 23, 2020, now abandoned, which is a continuation of U.S. patent application Ser. No. 16/241,745, filed Jan. 7, 2019, now U.S. Pat. No. 10,578,289, which is a continuation of U.S. patent application Ser. No. 15/588,114, filed May 5, 2017, now U.S. Pat. No. 10,222,037, which is a continuation of U.S. patent application Ser. No. 14/886,344, filed Oct. 19, 2015, now U.S. Pat. No. 9,671,097, which is a continuation of U.S. patent application Ser. No. 14/627,427, filed Feb. 20, 2015, now U.S. Pat. No. 9,243,788, which is a continuation of U.S. patent application Ser. No. 14/485,911, filed Sep. 15, 2014, now U.S. Pat. No. 9,140,438, which is a continuation-in-part of U.S. patent application Ser. No. 14/328,221, filed Jul. 10, 2014, now U.S. Pat. Nos. 9,157,588, 9,140,438 and 9,157,588 both claiming the benefit of U.S. Provisional Application No. 61/877,854, filed Sep. 13, 2013, the contents of which are all incorporated herein by reference in their entireties.

FIELD OF THE DISCLOSURE

The present invention is generally directed to decorative lighting. More specifically, the present invention is directed to decorative lighting assemblies, including net lights and icicle lights that are resistant to tangling and that provide consumer safety and convenience features.

BACKGROUND OF THE INVENTION

Decorative lighting assemblies, and in particular net lights and "icicle" lights are traditionally assembled using elaborate patterns of interconnected wires and lights to form a particular desired shape or structure. Net lights, for example, often form rectangular or square outlines using zig-zag patterns of conductors powering incandescent or light-emitting diode (LED) lamps. Icicle lights, with their various draping lengths of series-connected lamps rely on lengths of twisted wires across a top section and for each "icicle" drop.

In both cases, the extensive lengths of wire conductors twisted together to form the desired shape or outline of such decorative assemblies results in a consumer product prone to tangling. Not only does such tangling of wires result in consumer frustration, but the untangling of the wires can result in wires being pulled from their connectors, resulting in potential safety hazards.

SUMMARY OF THE INVENTION

Embodiments of the present disclosure provide decorative lighting assemblies, including net lights and icicle lights, that are less prone to tangling than traditional decorative lighting assemblies. As described below, the use of unique wire and lamp connectors, the layout of the wires, and in some cases, the reduction of wires between lamps, contributes to the tangle-resistant or tangle-reduced features of the embodiments.

In addition to the tangle-resistant features, an embodiment includes a decorative lighting assembly configured as an icicle light string that includes a main portion with detachably connected lighted-extension portions, or icicle drops. The connector system connecting the main portion and the lighted-extension portions includes features relating to safety and convenience, as described further below.

One embodiment includes a tangle-resistant decorative lighting assembly, comprising: a main portion including a plurality of wires and connectors, including first and second connectors and first and second lighted-extension portions extending transversely from the main portion. The first lighted extension portion including: a first connector configured to detachably connect to the first connector of the main portion, a first plurality of wires connected to the first connector, and a first plurality of lamp assemblies connected to the first plurality of wires. The second lighted-extension portion including: a second connector configured to detachably connect to the second connector of the main portion, a second plurality of wires connected to the second connector, and a second plurality of lamp assemblies connected to the second plurality of wires. The first connector of the main portion comprises a lock portion configured to engage with a lock portion of the first connector of the first lighted-extension portion.

Another embodiment includes decorative lighting connection system, comprising: a first connector for connection to a main portion of a decorative lighting assembly, the first connector including: a first body portion comprising a generally non-conductive portion and defining a first receiving channel; and a first lock portion; a second connector configured to connect to the first connector, the second connector including: a second body portion comprising a generally non-conductive portion and having a first portion configured to be inserted into the first channel of the first body portion of the first connector, the first portion of the second body defining a first channel; and a second lock portion configured to engage with the first lock portion; a first wire assembly including a first wire and a first electrically-conductive terminal connected to the first wire, the first electrically-conductive terminal and a portion of the first wire assembly located within the first receiving cavity; a second wire assembly including a second wire and a second electrically-conductive terminal connected to the second wire, the second electrically-conductive terminal and a portion of the second wire assembly located within the first receiving cavity; wherein the first connector is further configured such that insertion of the first portion of the first connector into the receiving cavity of the first connector causes the first electrically-conductive terminal to contact the second electrically-conductive terminal.

BRIEF DESCRIPTION OF THE DRAWINGS

The invention can be understood in consideration of the following detailed description of various embodiments of the invention in connection with the accompanying drawings, in which:

FIG. 6A is an exploded perspective view showing portions of a cord and a male portion of a fastener C;

FIG. 6B is an additional perspective view showing the cord and the male portion the fastener shown in FIG. 6A;

FIG. 6C is an exploded perspective view showing the male portion of the fastener and the female portion of the fastener shown in FIG. 6B;

FIG. 6D is an exploded perspective view showing the cord and first power wire of FIG. 6C coupled by the fastener;

Figure 1:
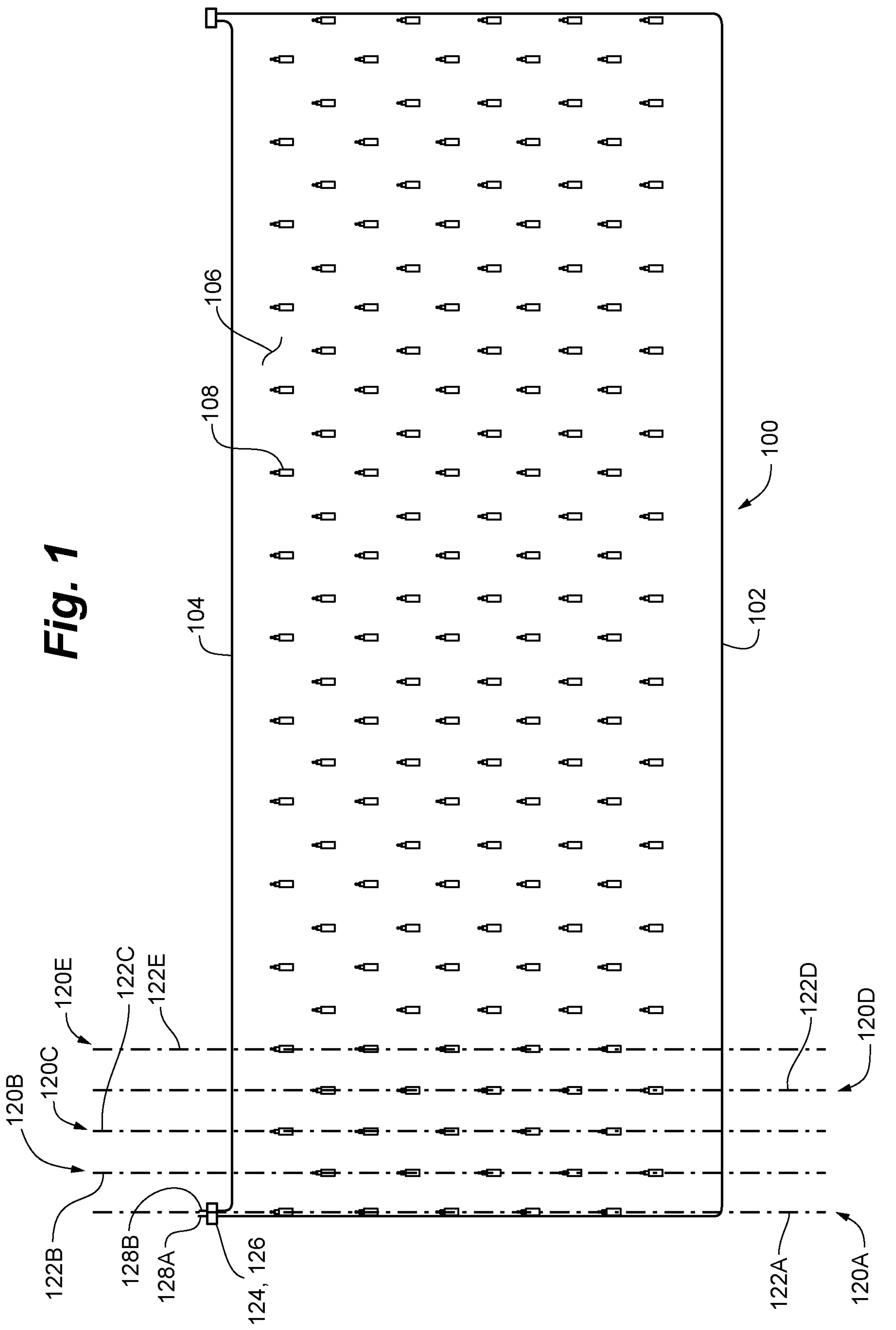
FIG. 1 is a plan view showing an illustrative embodiment of a decorative lighting assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

FIG. 1 is a plan view showing an illustrative embodiment of a decorative lighting assembly 100. Decorative lighting assembly 100 comprises a first power wire 102 and a second power wire 104. In FIG. 1, first power wire 102 and second power wire 104 are cooperating to surround a display area 106 of decorative lighting assembly 100. With reference to FIG. 1 it will be appreciated that decorative lighting assembly 100 includes a plurality of lamp assemblies 108 distributed across display area 106. The plurality of lamp assemblies 108 include a first column 120A of lamp assemblies 108 aligned along a first line 122A, a second column 120B of lamp assemblies 108 aligned along a second line 122B, and a third column 120C of lamp assemblies 108 aligned along a third line 122C.

A plurality of lamp assemblies 108 of decorative lighting assembly 100 may be inter-connected by wires to form one or more electrical circuits. A plurality of lamp assemblies 108 of decorative lighting assembly 100 may be mechanically coupled by cords which provide mechanical support. In some embodiments, the wires and the cords cooperate to form a net-like structure. In the embodiment of FIG. 1, the plurality of lamp assemblies 108 include a fourth column 120D of lamp assemblies 108 aligned along a first line 122D and a fifth column 120E of lamp assemblies aligned along a fifth line 122E.

Decorative lighting assembly 100 of FIG. 1 includes a power plug 124. Power plug 124 may comprise a traditional power plug comprising housing 126, first power terminal 128A and a second power terminal 128B for plugging into an outlet of an external power source, which may be an alternating-current (AC) power source. First power wire 102 is electrically connected to first power terminal 128A of power plug 124. Second power wire 104 is electrically connected to second power terminal 128B of power plug 124. In some embodiments, first power wire 102 and second power wire 104 may comprise a reinforced wire such as the reinforced wire described in published U.S. Patent Application US20150167944 (Now U.S. Pat. No. 9,243,788), filed Feb. 10, 2015, and entitled Decorative Lighting with Reinforced Wiring, which is herein incorporated by reference in its entirety.

With reference to FIG. 1, it will be appreciated that display area 106 of decorative lighting assembly 100 has a shape generally corresponding to a four-sided polygon. In the embodiment of FIG. 1, the shape of display area generally corresponds to a rectangle having a first long side, a second long side, a first short side, and a second short side. First power wire 102 defines the first short side, the first long side, and the second short side of a rectangle in the embodiment of FIG. 1. Second power wire 104 defines the second long side of a rectangle in the embodiment of FIG. 1.

Figure 2:
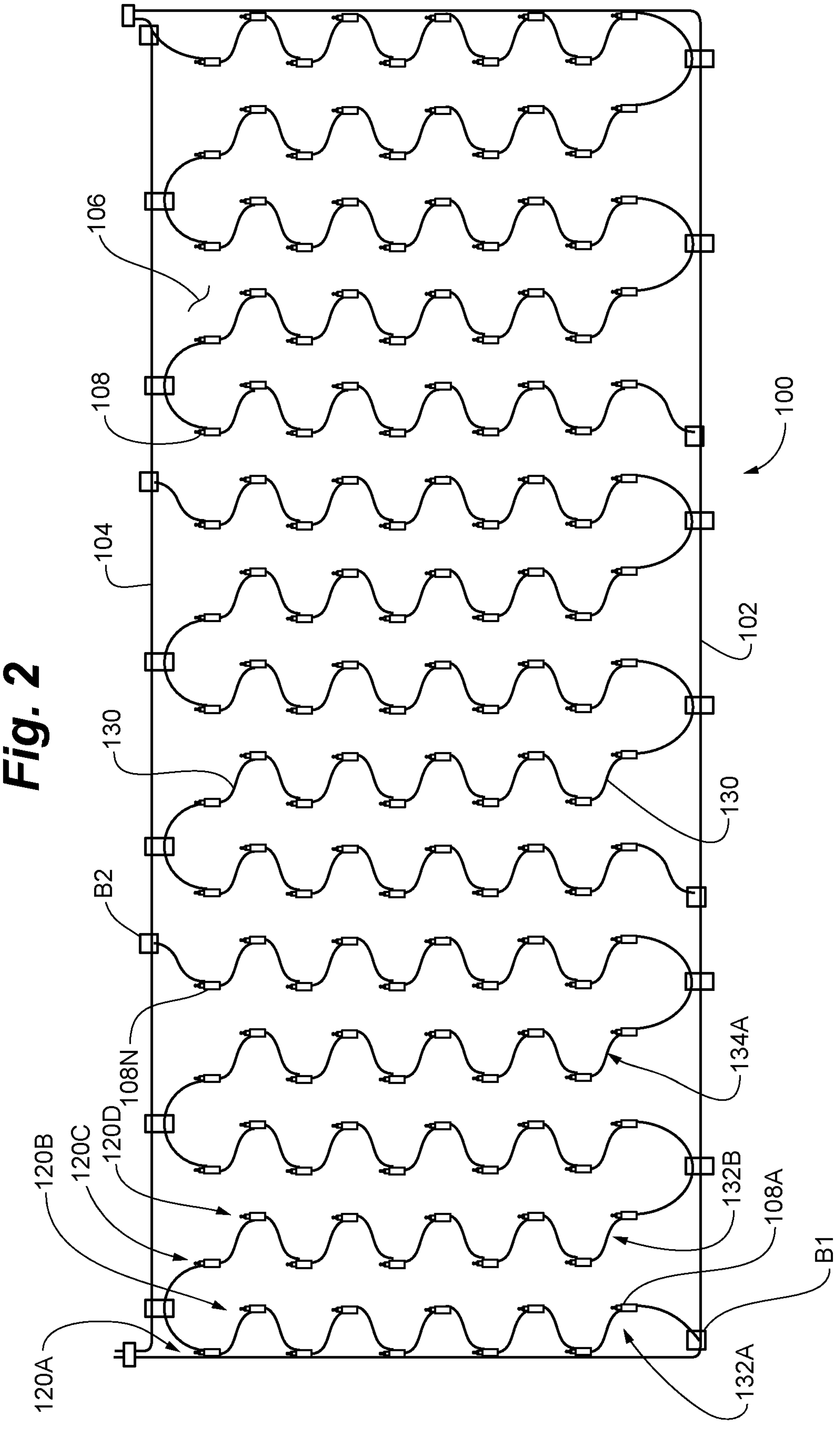
FIG. 2 is a plan view showing an additional illustrative embodiment of the decorative lighting assembly shown in FIG. 1.

FIG. 2 is a plan view showing an additional illustrative embodiment of decorative lighting assembly 100 shown in the previous figure. Decorative lighting assembly 100 comprises a first power wire 102 and a second power wire 104. In FIG. 2, first power wire 102 and second power wire 104 are cooperating to surround a display area 106 of decorative lighting assembly 100. With reference to FIG. 2 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, and a fourth column 120D of lamp assemblies 108.

In the embodiment of FIG. 2, a plurality of intermediate wires 130 are disposed along a first zig-zag path 132A connecting the lamp assemblies in first column 120A with the lamp assemblies in second column 120B. In some embodiments, decorative lighting assembly 100 may include a cord that is disposed along a second zig-zag path connecting the lamp assemblies in second column 120B with the lamp assemblies in third column 120C. In the embodiment of FIG. 2, decorative lighting assembly 100 includes a plurality of intermediate wires 130 that are disposed along a third zig-zag path 132C connecting the lamp assemblies in third column 120C with the lamp assemblies in fourth column 120D. In some embodiments, intermediate wires 130, first power wire 102 and second power wire 104 may comprise a reinforced wire such as the reinforced wire described in published U.S. Patent Application US20150167944 (Now U.S. Pat. No. 9,243,788), which is herein incorporated by reference in its entirety.

Decorative lighting assembly 100 of FIG. 2, includes a first series circuit 134A comprising a first lamp assembly 108A electrically connected to first power wire 102 at a connector B1 and an nth lamp assembly 108N electrically connected to second power wire 104 at a connector B2. In the embodiment of FIG. 2, a plurality of intermediate lamp assemblies 108 are electrically connected in series between first lamp assembly 108A and nth lamp assembly 108A.

With reference to FIG. 2, it will be appreciated that first series circuit 134 follows a winding path between connector B1 and connector B2 so that the lamp assemblies 108 are distributed across display area 106. In the embodiment of FIG. 2, the winding path of first series circuit 134 includes a plurality of intermediate wires 130 disposed along the first zig-zag path 132A connecting the lamp assemblies in first column 120A with the lamp assemblies 108 in second column 120B. First series circuit 134 also includes the plurality of intermediate wires 130 disposed along third zig-zag path 132C connecting the lamp assemblies 108 in third column 120C with the lamp assemblies 108 in fourth column 120D.

Figure 3:
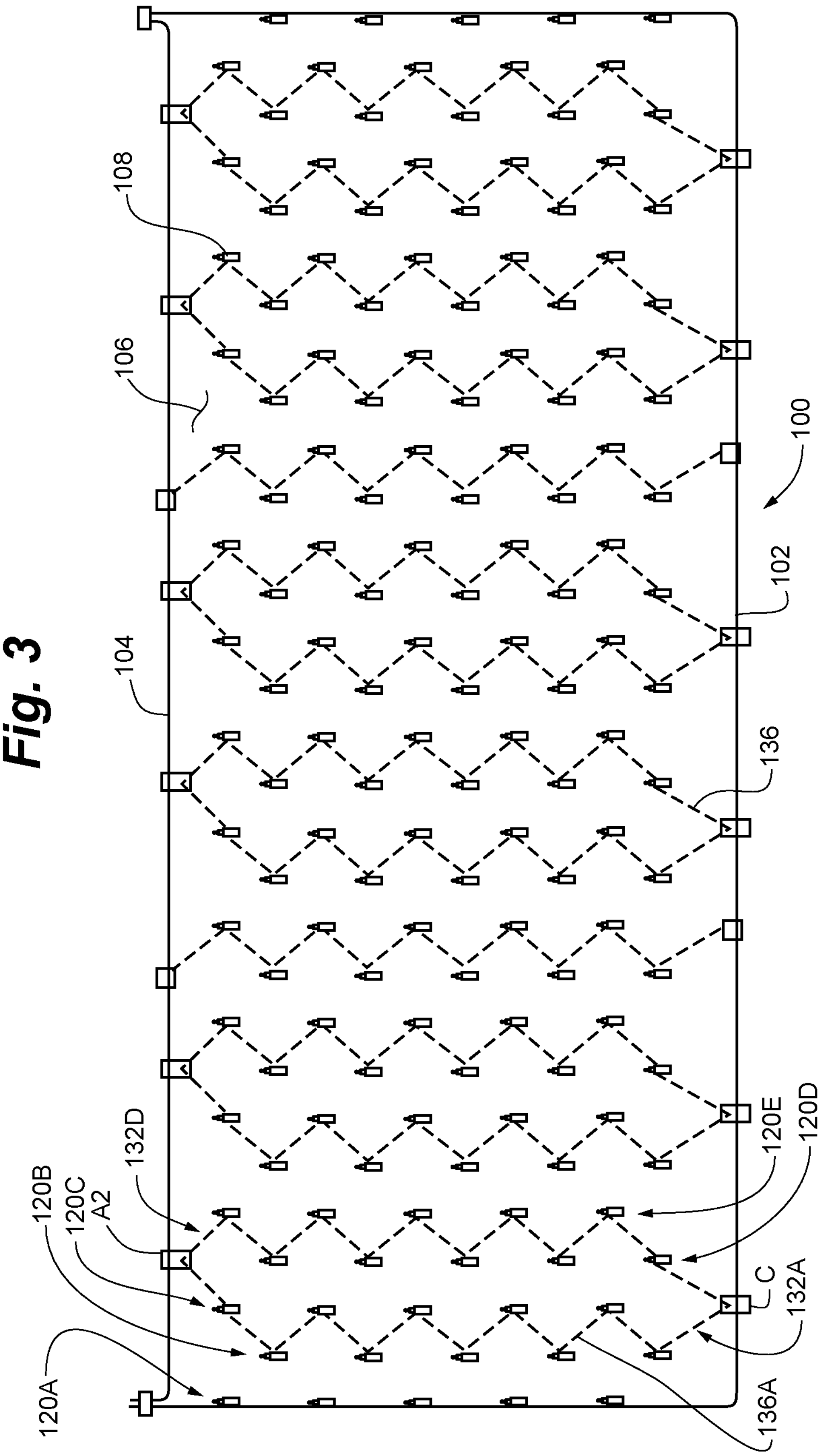
FIG. 3 is a plan view showing an additional illustrative embodiment of the decorative lighting assembly shown in FIG. 1.

FIG. 3 is a plan view showing an additional illustrative embodiment of decorative lighting assembly 100 shown in the previous figure. Decorative lighting assembly 100 comprises a first power wire 102 and a second power wire 104. In FIG. 3, first power wire 102 and second power wire 104 are cooperating to surround a display area 106 of decorative lighting assembly 100. With reference to FIG. 3 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, a fourth column 120 of lamp assemblies 108, and a fifth column 120E of lamp assemblies 108.

In the embodiment of FIG. 3, a plurality of lamp assemblies 108 of decorative lighting assembly 100 are mechanically coupled by cords 136 which provide mechanical support. In some embodiments, a plurality of lamp assemblies 108 of decorative lighting assembly 100 may be inter-connected by wires to form one or more electrical circuits. In some embodiments, the wires and the cords cooperate to form a net-like structure.

Decorative lighting assembly 100 of FIG. 1, includes a cord 136 that is disposed along a second zig-zag path 132A connecting the lamp assemblies in second column 120B with the lamp assemblies in third column 120C. In the embodiment of FIG. 3, cord 136 also extends along a fourth zig-zag path 132D connecting the lamp assemblies in fourth column 120D with the lamp assemblies in fifth column 120E. Cord 136 is illustrated using dashed lines in FIG. 3. In some embodiments, cord 136 may comprise a plurality of cord segments.

In the embodiment of FIG. 3, cord 136A comprises a single cord that extends through both second zig-zag path 132B and the fourth zig-zag path 132D. Decorative lighting assembly 100 of FIG. 3, includes a fastener C that mechanically couples a first end of cord 136A and a second end of cord 136A to first power wire 102. In the embodiment of FIG. 3, first power wire 102 extends through a passageway defined by fastener C.

Decorative lighting assembly 100 of FIG. 3 also includes a bushing A2 that mechanically couples an intermediate portion of cord 136A to second power wire 104. In the embodiment of FIG. 3, cord 136A and second power wire 104 extend through a passageway defined by bushing A2. Also in the embodiment of FIG. 3, cord 136A extends through a passageway defined by a clip of each lamp assembly 108 in second column 120A and each lamp assembly 108 in third column 120C.

Figure 4:
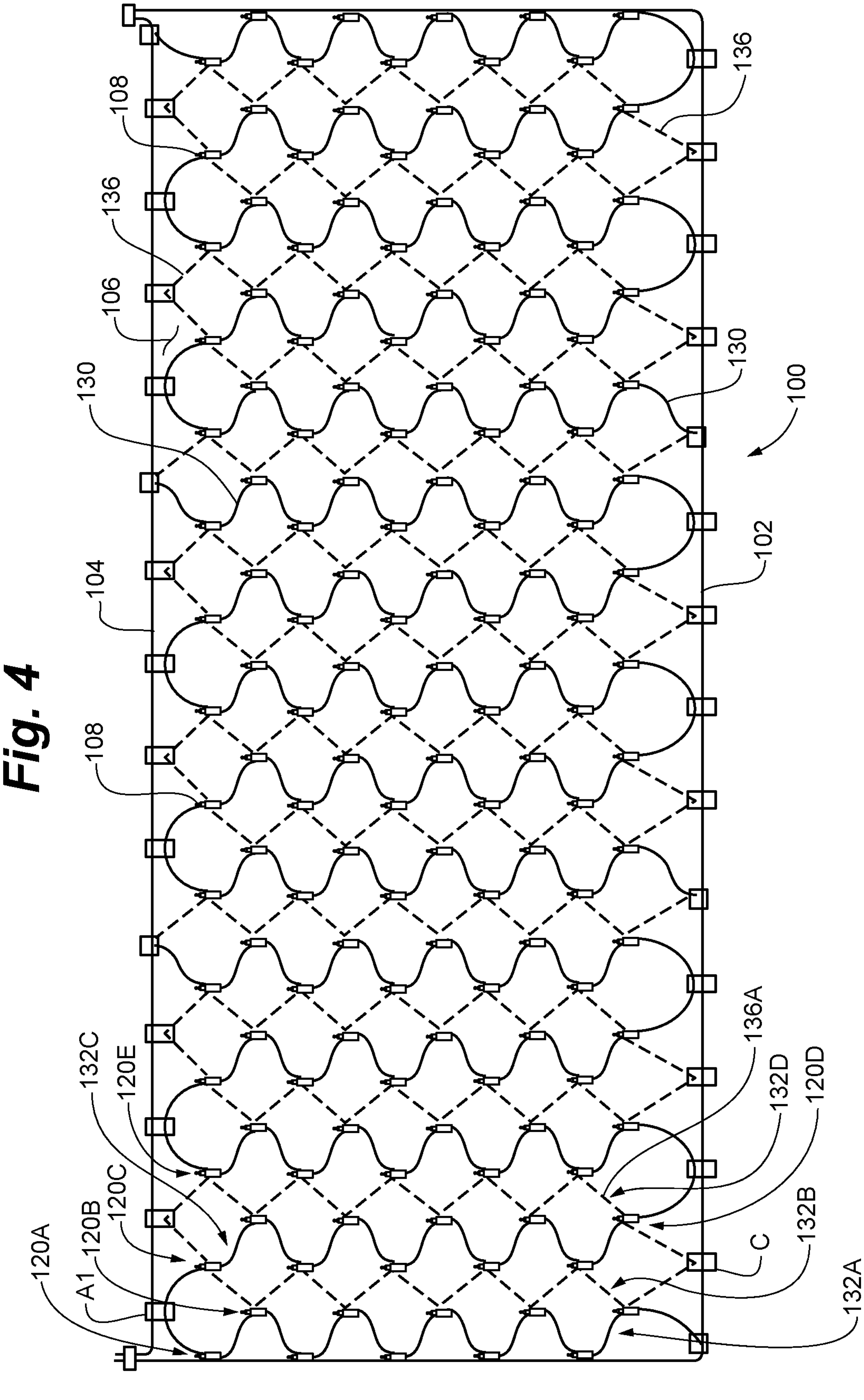
FIG. 4 is a plan view showing an additional illustrative embodiment of the decorative lighting assembly shown in FIG. 1.

FIG. 4 is a plan view showing an additional illustrative embodiment of decorative lighting assembly 100 shown in the previous figure. Decorative lighting assembly 100 comprises a first power wire 102 and a second power wire 104. In FIG. 4, first power wire 102 and second power wire 104 are cooperating to surround a display area 106 of decorative lighting assembly 100. With reference to FIG. 4 it will be appreciated that decorative lighting assembly 100 includes a plurality of lamp assemblies 108 distributed across display area 106. The plurality of lamp assemblies 108 include a first column 120A of lamp assemblies 108, a second column 120B of lamp assemblies 108, a third column 120C of lamp assemblies 108, a fourth column 120 of lamp assemblies 108, and a fifth column 120E of lamp assemblies 108.

In the embodiment of FIG. 4, a plurality of lamp assemblies 108 of decorative lighting assembly 100 are interconnected by intermediate wires 130 to form electrical circuits. Also in the embodiment of FIG. 4, a plurality of lamp assemblies 108 of decorative lighting assembly 100 are mechanically coupled by cords 136 which provide mechanical support. In the embodiment of FIG. 4, the wires and the cords cooperate to form a net-like structure. For purposes of illustration, the cords are illustrated using dashed lines and the wires are illustrated using solid lines in FIG. 4.

In the embodiment of FIG. 4, a plurality of intermediate wires 130 are disposed along a first zig-zag path 132A connecting the lamp assemblies in first column 120A with the lamp assemblies in second column 120B. Also in the embodiment of FIG. 4, decorative lighting assembly 100 includes a cord 136A that extends along a second zig-zag path 132B connecting the lamp assemblies in second column 120B with the lamp assemblies in third column 120C. A plurality of intermediate wires 130 are disposed along a third zig-zag path 132C connecting the lamp assemblies in third column 120C with the lamp assemblies in fourth column 120D. In the embodiment of FIG. 4, cord 136A extends along a fourth zig-zag path 132D connecting the lamp assemblies in fourth column 120D with the lamp assemblies in fifth column 120E. Cord 136A is illustrated using dashed lines in FIG. 4. In some embodiments, cord 136A may comprise a plurality of cord segments.

In the embodiment of FIG. 4, cord 136A comprises a single cord that extends through both second zig-zag path 132B and the fourth zig-zag path 132D. Decorative lighting assembly 100 of FIG. 4, includes a fastener C that mechanically couples a first end of cord 136A and a second end of cord 136A to first power wire 102. In the embodiment of FIG. 4, first power wire 102 extends through a passageway defined by fastener C.

With reference to FIG. 4, it will be appreciated that a top-most intermediate wire extends between a top-most lamp assembly in first column 120A and a top-most lamp assembly in third column 120C. In the embodiment of FIG. 4, a bushing A1 mechanically couples an intermediate portion of the first top-most intermediate wire to second power wire 104. In the embodiment of FIG. 4, the second power wire 104 and the top-most intermediate wire extend through a passageway defined by bushing A1.

In some embodiments of decorative lighting assembly 100, the intermediate wires 130 have a first outer diameter, the cords 136 have a second outer diameter, and the second outer diameter is substantially equal to the first outer diameter so that decorative lighting assembly 100 has a uniform appearance.

In some embodiments of decorative lighting assembly 100, the intermediate wires 130 comprise a plurality of conductor strands and an outer insulating layer adjacent to, and covering, one or more of the conductor strands. The cords 136 may comprise a solid strand. In some embodiments of decorative lighting assembly 100, the insulating layer of the intermediate wires 130 and the solid strand of the cords 136 comprise the same material so that the decorative lighting assembly has a uniform appearance. In some embodiments of decorative lighting assembly 100, the insulating layer of the intermediate wires 130 and the solid strand of the cords 136 are substantially the same color so that the decorative lighting assembly has a uniform appearance.

In some embodiments of decorative lighting assembly 100, the first power wire comprises 18 AWG wire, the second power wire comprises 18 AWG wire, and the intermediate wires comprise 22 AWG wire.

In some embodiments of decorative lighting assembly 100, the first power wire comprises 18 AWG wire, the second power wire comprises 18 AWG wire, and the intermediate wires comprise 22 AWG reinforced wire.

In some embodiments of decorative lighting assembly 100, the first power wire comprises 18 AWG wire, the second power wire comprises 18 AWG wire, and the intermediate wires comprise 25 AWG reinforced wire.

Figure 5A:
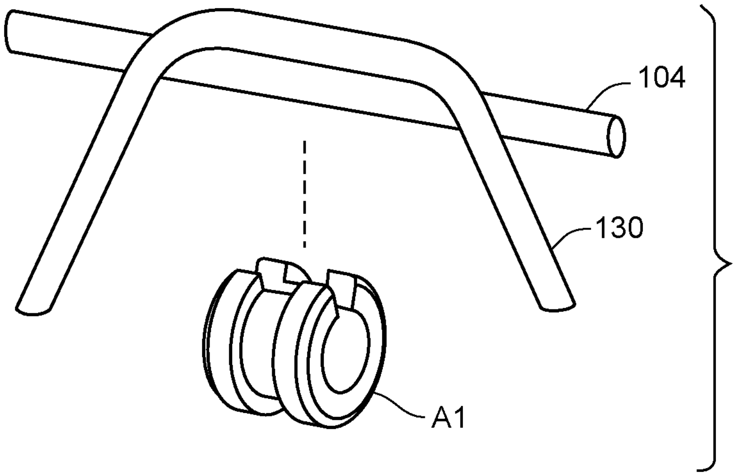
FIG. 5A is an exploded perspective view showing a power wire, an intermediate wire, and a bushing.
Figure 5B:
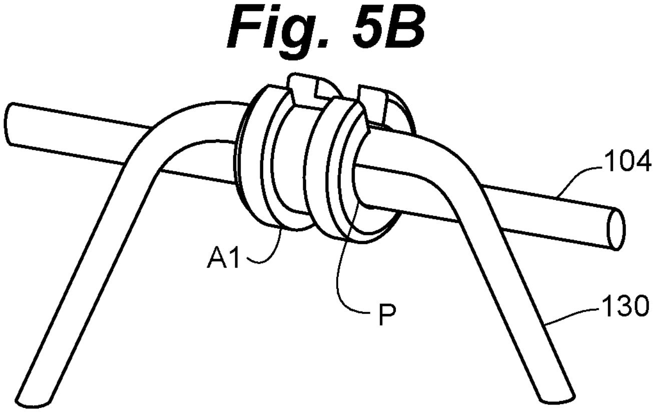
FIG. 5B is a perspective view showing the second power wire, the intermediate wire, and the bushing shown in of FIG. 5A.

FIG. 5A is an exploded perspective view showing a second power wire 104, an intermediate wire 130, and a bushing A1. FIG. 5B is a perspective view showing second power wire 104, intermediate wire 130, and bushing A1 of FIG. 5A in an assembled state. In FIG. 5B, intermediate wire 130 and second power wire 104 can be see extending through a passageway P defined by bushing A1.

Figure 5C:
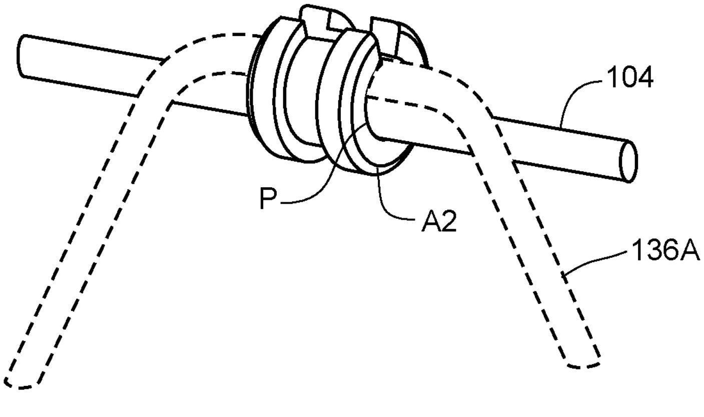
FIG. 5C is a perspective view showing the second power wire, the intermediate wire, and the bushing shown in of FIG. 5A.

FIG. 5C is a perspective view showing a second power wire 104, a cord 136, and a bushing A2. In the embodiment of FIG. 5C, cord 136A and second power wire 104 extend through a passageway P defined by bushing A2.

FIG. 6A is an exploded perspective view showing portions of a cord 136A and a male portion 142M of fastener C. A first end 140A and a second end 140B of cord 136A are visible in FIG. 6A.

FIG. 6B is an additional perspective view showing portions of cord 136A and male portion 142M of fastener C. In the embodiment of FIG. 6B, first end 140A and second end 140B of cord 136A are fixed to male portion 142M of fastener C.

FIG. 6C is an exploded perspective view showing a male portion 142M of fastener C and a female portion 142F of fastener C. In the embodiment of FIG. 6C, first end 140A and second end 140B of cord 136A are fixed to male portion 142M of fastener C. In FIG. 6C, a first power wire 102 can be seen extending through a passageway P defined by female portion 142F of fastener C.

FIG. 6D is an exploded perspective view showing cord 136 coupled to first power wire 102A by fastener C. In the embodiment of FIG. 6D, first end 140A and second end 140B of cord 136A are fixed to male portion 142M of fastener C. In FIG. 6D, first power wire 102 can be seen extending through a passageway P defined by fastener C.

Figure 7B:
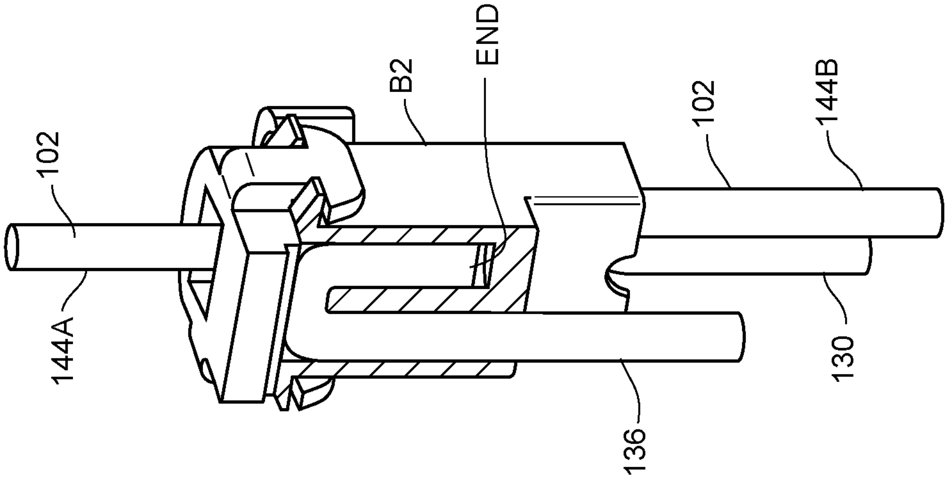
FIG. 7B is a perspective view showing a connector.
Figure 7A:
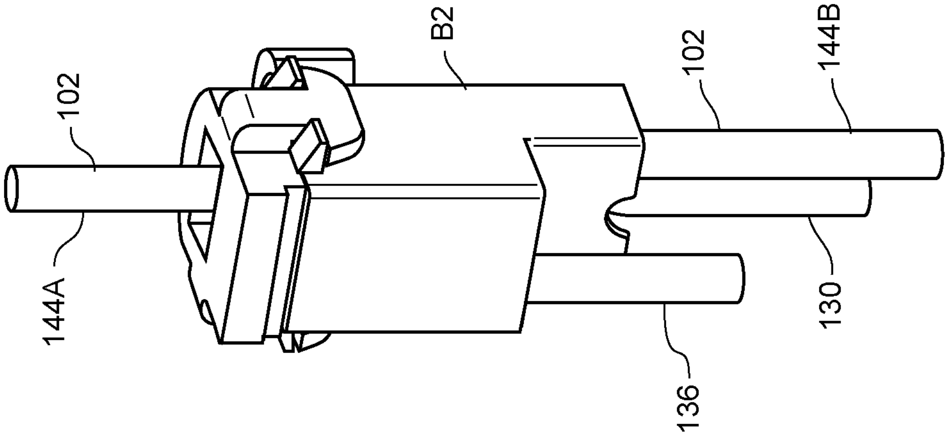
FIG. 7A is a perspective view showing a connector.

FIG. 7A is a perspective view showing a connector B2. In the embodiment of FIG. 7A, a first portion 144A of a power wire 102, a second portion 144B of power wire 102 and an intermediate wire 130 are electrically connected to each other by connector B2. The embodiment of FIG. 7A also includes a cord 136. In the embodiment of FIG. 7A, cord 136, first portion 144A of power wire 102, second portion 144B of power wire 102, and intermediate wire 130 are all mechanically coupled to each other by connector B2.

FIG. 7B is a perspective view showing a connector B2. In the embodiment of FIG. 7B, connector B2 is sectioned so that one end of cord 136 can be seen captured inside connector B2. In the embodiment of FIG. 7B, cord 136, first portion 144A of power wire 102, second portion 144B of power wire 102, and intermediate wire 130 are all mechanically coupled to each other by connector B2. First portion 144A of a power wire 102, a second portion 144B of power wire 102 and an intermediate wire 130 are electrically connected to each other by connector B2 in the embodiment of FIG. 7B.

Figure 8A:
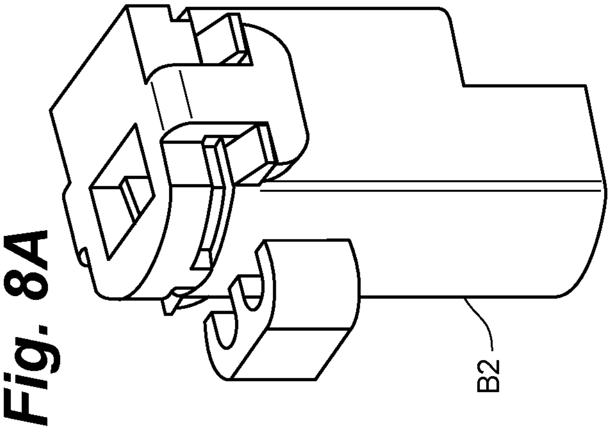
FIG. 8A is a perspective view showing an alternate embodiment of the connector shown in FIG. 7A and FIG. 7B.

FIG. 8A is a perspective view showing an alternate embodiment of connector B2 shown in FIG. 7A and FIG. 7B.

Figure 8B:
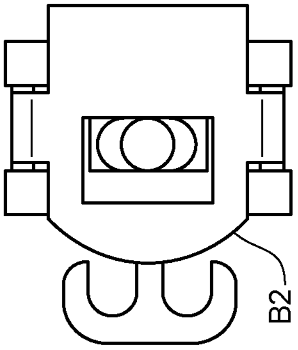
FIG. 8B is a plan view of the connector shown in FIG. 8A.

FIG. 8B is a plan view showing the connector B2 shown in FIG. 8A.

Figure 9A:
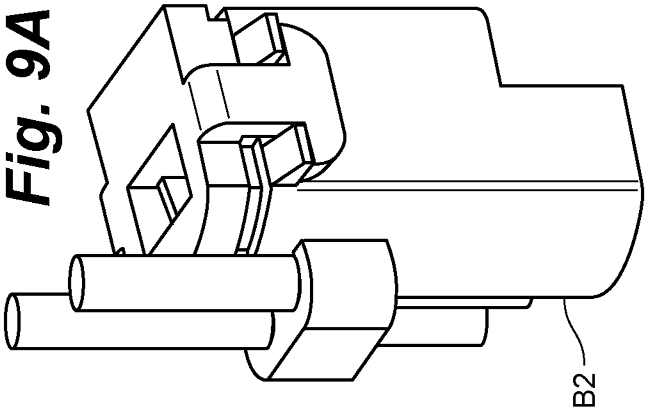
FIG. 9A is a perspective view showing an alternate embodiment of the connector shown in FIG. 7A and FIG. 7B.

FIG. 9A is a perspective view showing an alternate embodiment of connector B2 shown in FIG. 7A and FIG. 7B.

Figure 9B:
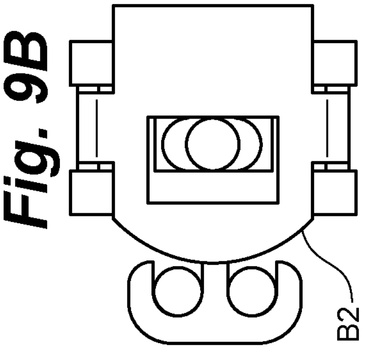
FIG. 9B is a plan view of the connector shown in FIG. 9A.

FIG. 9B is a plan view showing the connector B2 shown in FIG. 9A.

Figure 10A:
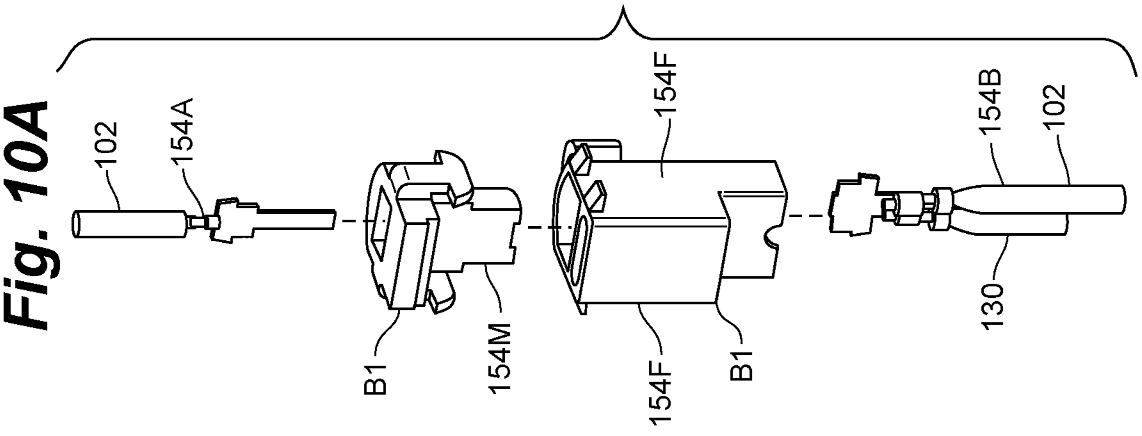
FIG. 10A is an exploded perspective view showing a male portion of a connector and a female portion of the connector, a first portion of a power wire, a second portion of the power wire and an intermediate wire.

FIG. 10A is an exploded perspective view showing a male portion 154M of connector B1 and a female portion 152F of connector B1. A first portion 154A of a power wire 102, a second portion 154B of power wire 102 and an intermediate wire 130 are all illustrated in the exploded view of FIG. 10A.

Figure 10B:
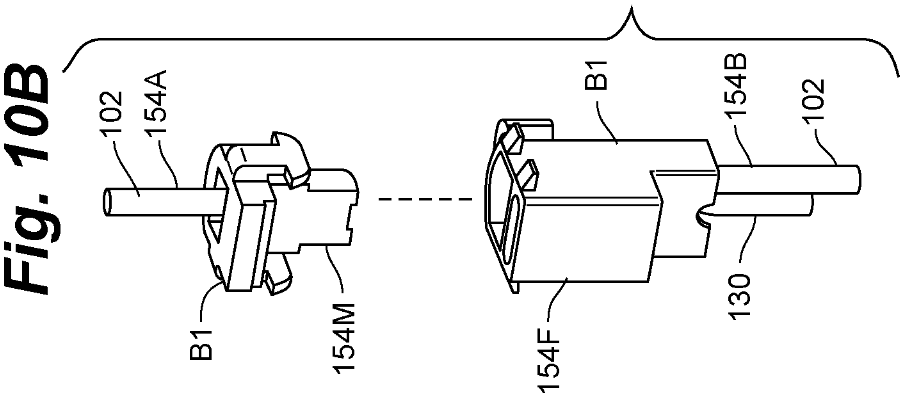
FIG. 10B is a partially assembled perspective view showing the male portion of the connector and the female portion of the connector shown in FIG. 10B.

FIG. 10B is a partially assembled perspective view showing male portion 154M of connector B1 and female portion 152F of connector B1. In the embodiment of FIG. 10B, first portion 154A of power wire 102 has been inserted into male portion 154M of connector B1. Also in the embodiment of FIG. 10B, a second portion 154B of power wire 102 and an intermediate wire 130 have been inserted into female portion 154F of connector B1.

Figure 10C:
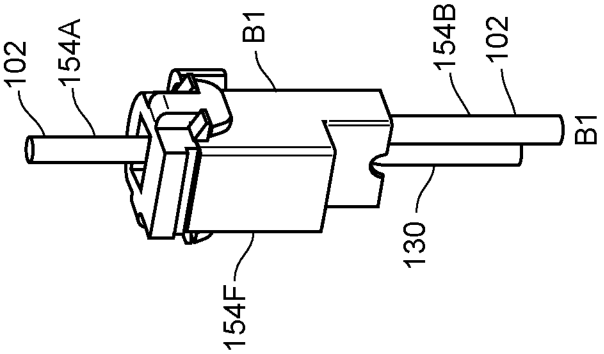
FIG. 10C is an assembled perspective view showing the male portion of the connector and the female portion of the connector shown in FIG. 10B.

FIG. 10C is an assembled perspective view showing a male portion 154M of connector B1 and a female portion 152F of connector B1. In the embodiment of FIG. 10C, male portion 154M of connector B1 has been inserted into female portion 152F of connector B1. First portion 154A of power wire 102, second portion 154B of power wire 102 and intermediate wire 130 all are electrically connected to each other by connector B2 in the embodiment of FIG. 10C. First portion 154A of power wire 102, second portion 154B of power wire 102, and intermediate wire 130 are also mechanically coupled to each other by connector B2 in the embodiment of FIG. 10C.

Figure 10D:
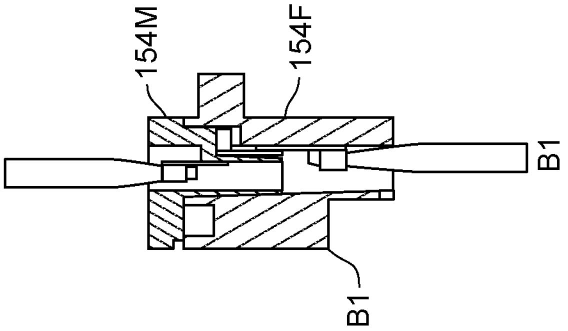
FIG. 10D is a section view further illustrating the male portion of the connector and the female portion of the connector shown in FIG. 10B.

FIG. 10D is a section view further illustrating male portion 154M of connector B1 and female portion 152F of connector B1.

Figure 11A:
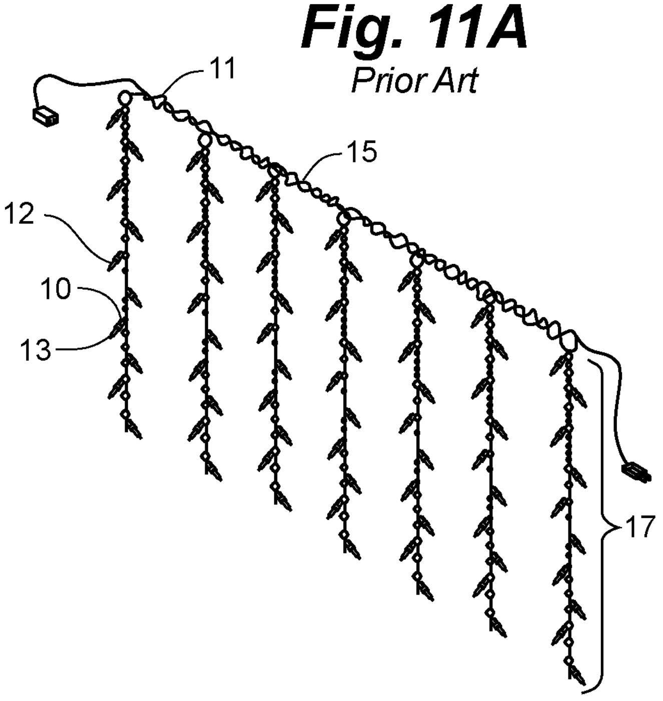
Fig. 11A Prior Art
FIG. 11A is a prior art depiction of an icicle-light decorative lighting assembly.
Figure 11B:
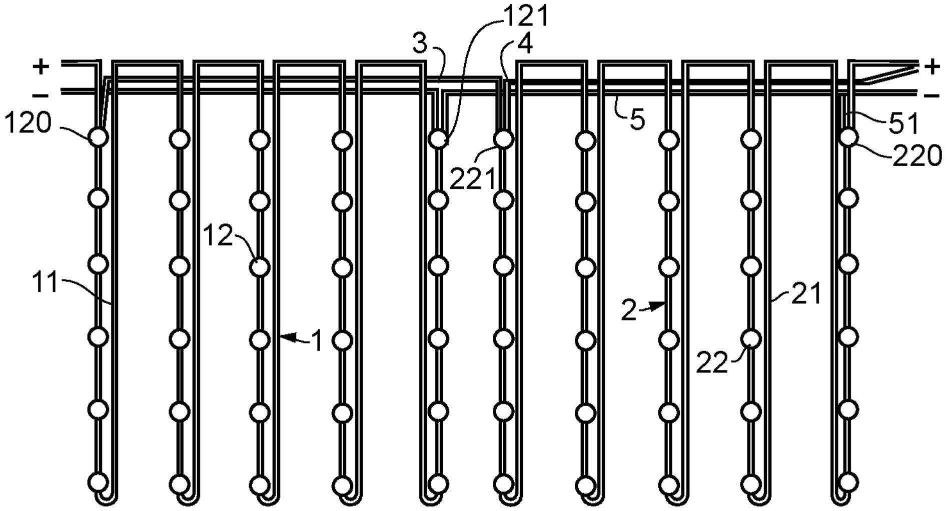
Fig. 11B Prior Art
FIG. 11B is another prior art depiction of an icicle-light decorative lighting assembly.

Referring first to FIGS. 11A and 11B, prior-art icicle light assemblies depicted. Referring to FIG. 11A, in this traditional decorative lighting assembly, segments of wires, i.e., insulated electrical conductors, interconnect multiple lamp holders 10 with lamps 13. The structure includes a top, horizontally extending portion 15 comprising twisted portions of wires, as well as multiple vertically extending portions of "icicle" drops 17 with lamps wired, typically, in an electrical series connection.

Referring also to FIG. 11B, a schematic of a typical prior-art icicle light assembly before twisting is depicted. As depicted, long strands of wires interconnect lamps 12 and 22.

Typically, such known decorative lighting structures form one integral, contiguous lighting assembly not intended to be separated, save for lamps.

Referring to FIGS. 12A-35, embodiments of tangle-resistant decorative lighting assemblies and connectors for "icicle" lights of the disclosure are depicted.

As described further below, embodiments of the present disclosure may employ some traditional wire-twisting features found in the prior art, but are distinguished in part by the wiring and connection structures that allow individual icicle drops to be connected and disconnected from the main horizontal wiring. As will also be described further below, the connectors and wiring structures not only provide features convenient to consumers using the lighting assemblies, but also provide benefits relating to ease of manufacturing.

Figures 12A, 12B:
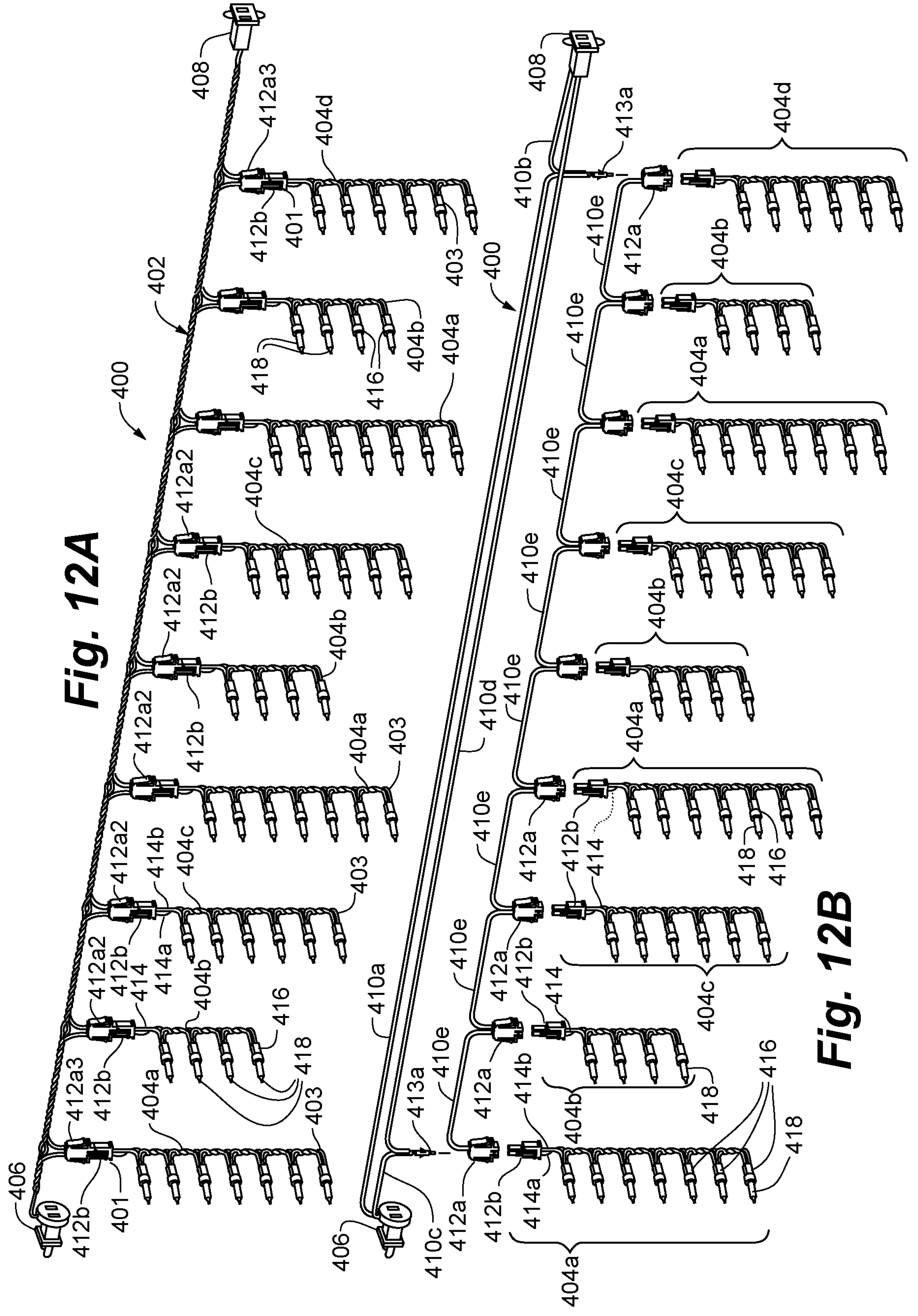
FIG. 12A is a perspective view of a decorative lighting assembly according to an embodiment of the present disclosure.
FIG. 12B is a partially exploded view of the decorative lighting assembly of FIG. 12A.

Referring to FIGS. 12A and 12B, an embodiment of decorative lighting assembly 400 in the form of an icicle light assembly is depicted. FIG. 12A depicts a fully-assembled version of decorative lighting assembly 400, while in FIG. 12B, a partially-disassembled version of decorative lighting assembly 400 is depicted.

In an embodiment, and as depicted, decorative lighting assembly 400 includes main portion 402 and a plurality of lighted extension portions 404, including lighted-extension portions 404*a*, 404*b*, 404*c* and 404*d*. In an embodiment, main portion 402 extends horizontally, or latitudinally, while lighted-extension portions 404 extend vertically or longitudinally from main portion 402. In an embodiment, lighted-extension portions 404 extend perpendicularly or transversely to main portion 402, when assembled and in a display position. In an embodiment, and as depicted, lighted-extension portions 404 are not coupled to one another.

Because lighted-extension portions 404 are detachably coupled to main portion 402, they may be detached and replaced in the event of a failure of lamp assemblies, connectors, and so on. Further, the detachable nature of lighted-extension portions 404 allows different configurations of lighted-extension portions to be exchanged. As depicted in the figures, each portion 404 is intended to be an "icicle strand" or "icicle drop", giving the appearance of winter icicles, perhaps displayed at a rooftop edge. In other embodiments, the icicle-drop style portion 404 may be replaced with another electrically-compatible portion 404, such as lighted ornament (typically some sort of housing with a plurality of lamp assemblies). In another embodiment, portions 404 having lamps of a particular color may be exchanged for lamps of another color, allowing for mixing and matching by a user to create a desired color scheme.

Consequently, in an embodiment, decorative lighting assembly 400 may comprise a set comprising main portion 402 and lighted-extension portions 404, wherein more extension portions 404 than can be accommodated by main portion 402, e.g., main portion 402 has connectors for 8 lighted-extension portions 404, but 16 are provided. The extra portions 404 may be interchangeable, and comprise different colors, comprise ornaments, or comprise other lighting and decorative features.

In an embodiment, main portion 402 includes power plug 406, optional end-power connector 408, main wiring 410, and a plurality of connectors 412*a*.

In an embodiment, power plug 406 is configured to be inserted into an external supply of power, such as a wall socket. In other embodiments, power plug 406 may be configured to connect to alternative source of power or control device.

Optional end-power connector 408, in an embodiment, is configured to provide power to another decorative light assembly, such as another decorative light assembly 400.

Main wiring 410, in an embodiment, comprises a plurality of wires or wire segments. In an embodiment, and as depicted, main wiring 410 includes wires 410*a*, 410*b*, 410*c*, 410*d* and a plurality of wires 410*e*. In this embodiment, wires 410*a* and 410*b* are mechanically and electrically connected, while wires 410*c* and 410*d* are electrically connected. As also depicted, an end of wire 410 is mechanically and electrically connected to a first electrical terminal of power plug 406, and end of wire 410*b* is connected to a first electrical terminal of optional end-power connector 408.

Wires 410*c* and 410*d* are mechanically and electrically connected to one another, with an end of wire 410*c* connected to a second terminal of power plug 406, while an end of wire 410*d* is connected to a second terminal of end-power connector 408.

Wires 410*e* electrically connect connectors 412*a*. In an embodiment, wires 410*e* connect to connectors 412*a* such that connectors 412*a* (and 412*b*) and lamp assemblies of lighting-extension portions 404 are electrically connected in series.

In an embodiment, connectors 412*a* may be configured to receive two or more wires. In an embodiment, connectors 412*a* may be configured to receive two, three or four wires. More specifically, connectors 412*a*3 are configured to receive three wires, such as 410*c*, 410*d* and 410*e*. Connectors 412*a*2 are configured to receive two wires, such as a pair of wires 410*e*. Embodiments of connectors 412, including connectors 412*a*2 and 412*a*3 are described further below.

In some embodiments, some or all of wires 410 may comprise a reinforced wire such as the reinforced wire described in published U.S. Patent Application US20150167944, filed Feb. 10, 2015, and entitled Decorative Lighting with Reinforced Wiring, which is herein incorporated by reference in its entirety.

In this electrical configuration, when power is applied to power plug 406, power is also available at end-power connector 408. Wires 410*a* and 410*b* may be considered first polarity wires, such as positive, live or hot, and wires 410*c* and 410*d* may be considered second polarity wires, such as negative, or neutral.

As will be described further below, ends of wires may be joined together with electrically-conductive terminals 413. In an embodiment, terminals 413 not only couple wires together, but also serve to connect wires to connectors 412*a* and connectors 412*b* of lighting extension portions 410, as also described further below.

In an embodiment, each lighted-extension portion 404, including lighted-extension portions 404*a*, 404*b*, 404*c* and 404*d*, includes connector 412*b*, a plurality of multiple lamp wires 414, lamp holders 416 and lamp assemblies 418. Each lighted-extension 404 defines a connector end 401 and a free end 403. In an embodiment, connector end 401 is connected to main portion 402, while free end 403 is not connected to main portion 402 or other lighted-extension portions 404. In one such embodiment, except for the connection of end 401 to main portion 402, lighted-extension portions 404 do not connect to any other adjacent structures. In an embodiment, connector pair 412*a*/412*b* is not the same as lamp holder 416. In an embodiment, connectors 412*a* and 412*b* form a decorative lighting connector system, and more specifically, a decorative lighting lighted-extension connection system.

As described further below, each connector 412*b* of lighting-extension portion is configured to mechanically and electrically connect to a connector 412*a* of main portion 402. In some embodiments, and as depicted, connector pairs 412*a* and 412*b* are intended to be detachably coupled. In other embodiments, connector pairs 412*a* and 412*b* are not detachably coupled, and are not intended to be easily detached from one another by a consumer after manufacturing assembly.

Lamp wires 414 electrically connect connector 412*b* to lamps 418, and connect lamps 418 to other lamps 418, in each lighting-extension portion 404. In an embodiment, lamp wires 414 may be twisted about one another as depicted.

In an embodiment, a wire 414, such as 414*a* is connected to a first terminal of a connector 412*b*, while another wire 414, such as 414*b*, is connected to a second terminal of the connector 412*b*. In a series connected lighting assembly, such as is depicted, wire 414*a* is electrically connected to a first lamp 418 (nearest the connector 412*b*) in the lighting-extension portion 404, while wire 414*b* is electrically connected to a last lamp 418 in the lighting-extension portion 404.

In the depicted embodiment, lighted-extension portion 404*a* includes seven lamp assemblies 418, lighted-extension portion 404*b* includes four lamp assemblies 418, lighted-extension portion 404*c* includes six lamp assemblies 418, and lighted-extension portion 404*d* includes five lamp assemblies 418. The number of lamp assemblies per lighted-extension portion 404 may vary depending on the light pattern desired, and be different from that depicted.

In the embodiment depicted, decorative lighting assembly 400 includes 50 lamp assemblies 418 in total, with each lamp assembly wired to the other in electrical series. In one such embodiment, each lamp assembly is rated for approximately 2.5 volts, with an expectation that decorative lighting assembly 400 will be powered by an external alternating current (AC) power source providing approximately 125 VAC.

In other embodiments, lamp assemblies 418 may be wired in parallel, as described below, or may be wired in parallel series.

Lamp assemblies 418 may comprise incandescent lamps or LEDs, configured to operate on AC or DC power, and having various voltage ratings, as will be understood by those of ordinary skill.

Referring to FIGS. 13A to 16B, embodiments of connectors 412*a* and 412*b* are depicted.

Figure 13A:
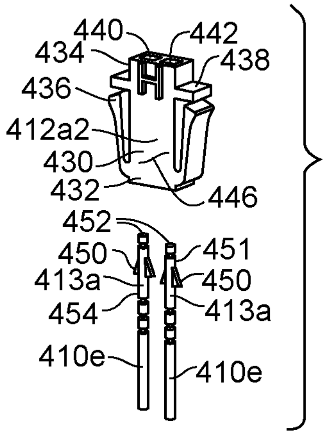
FIG. 13A is a perspective view of an embodiment of a female 2-wire connector and wires, according to an embodiment of the present disclosure.
Figure 13B:
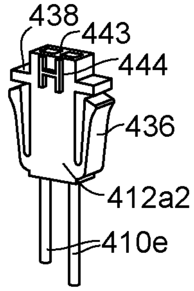
FIG. 13B is a perspective view of the 2-wire connectors and wires of FIG. 13A assembled together.

Referring specifically to FIGS. 13A and 13B, connector 412*a*2 is depicted. In the embodiment depicted, connector 412*a*2 includes generally non-conductive body portion 430, first end 432, and second end 434. In an embodiment, body portion 430 includes a pair of user-gripping portions 436 and a pair of tabs 438. User-gripping portions 436, in an embodiment, are configured to be gripped or grasped by a user to assist in separating connector 412*a* and connector 412*b*, and may comprise a pair of projections joined to body portion 430 at first end 432. User-gripping portions 436 may be configured to bend or pivot at their respective connection points to end 432. Optional tabs 438, when present may prevent a user's hand from slipping off of connector 412*a*, when gripping portions 436 and pulling.

First end 432 of connector 412*a* (412*a*2 in this embodiment), defines one or more openings or channels configured to receive terminals 413, including terminals 413*a*, and wires, such as 410*e*.

Second end 434 of connector 412*a* defines a first receiving channel 440 and a second receiving channel 442. Channels 440 and 442 may extend through body portion 430 to form the channels in first end 432. In an embodiment, channels 440 and 442 are two separate and distinct channels separated by an inner structure, such as a wall 443. In another embodiment, not depicted, channels 440 and 442 combine to form a single channel to receive end 462 of connector 412*b*, as described further below.

In an embodiment, channels 440 and 442 define dissimilar shapes such that connector 412*b* may only be coupled to connector 412*a* in a single orientation. In an embodiment, and as depicted, channel 440 defines a circular opening and a cylindrical channel, while channel 442 defines a square opening. In an embodiment, channels 440 and 442 extend the entire length of body portion 430.

As described further below, channels 440 and 442 are each configured to receive a portion of connector 412*b*.

In an embodiment, body portion 430 includes lock portion 444 on surface 446. Lock portion 444 is configured to detachably receive a lock portion of connector 412*b*, as will be described further below. In the embodiment depicted and described, the lock portion of the connectors may be locked and unlocked by a user without the necessity of tools, i.e., can be locked and unlocked by hand. This contrasts with a locking feature described further below in an alternate embodiment where locking and unlocking requires that an end user utilize a tool.

Still referring to FIGS. 13A and 13B, a pair of terminals 413*a* are attached to a pair of wires 410*e*, respectively.

In an embodiment, each terminal 413*a* includes a pair of barbs or projections 450 attached at one end to a body portion 451 and configured to pivot about at the attached end. Projections 450 may take other shapes as needed to cooperate with connector 412 for attachment.

Body portion 451, in an embodiment, defines an opening or channel 452 configured to receive an end, or male portion, 415 of terminal 413*b* of connector 412*b*. Body portion 451, in an embodiment, defines a lengthwise slot 454, such that terminal 413*a* comprises a spring, and is able to be radially expanded or contracted when terminal 413*b* is inserted, or removed from, terminal 413*a*.

Each terminal 413*a* is configured to be crimped onto, or otherwise connected to, a conductive portion of a wire, such as a wire 410*e*, such that terminal 413*a* is in mechanical and electrical connection with the wire 410.

As depicted, terminal 413*a*, and a portion of wire 410*e* is inserted into connector body 430 at end 432, and into channels 440 and 442. In an embodiment, when inserted into connector 412*a*, projections, or barbs, 450, engage an inside surface or structure of connector 412*a*, preventing terminal 413*a* from easily being pulled back out of connector 412*a* after initial insertion.

Figure 15A:
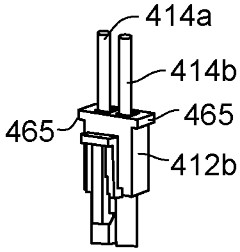
FIG. 15A is a perspective view of a male 2-wire connector and wire assembly for connection to the female connector of FIGS. 13A and 13B.
Figure 15B:
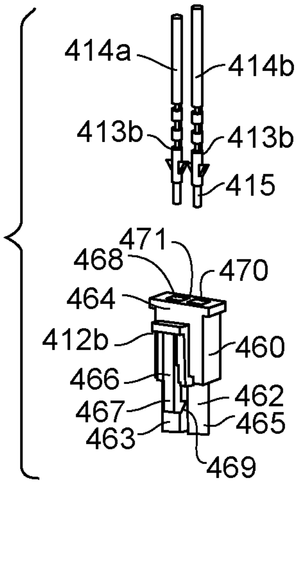
FIG. 15B is a partially exploded view of view of 2-wire connector with wires of FIG. 15A.

Referring to FIGS. 15A and 15B, an embodiment of connector 412*b* is depicted. In an embodiment, connector 412*b* is a male connector configured to couple with a female connector, such as connector 412*a*, including connector 412*a*2, and in some embodiments with any of connectors 412*a*2 (2-wire), 412*a*3 (3-wire), or 412*a*4 (4-wire). In an embodiment, connector 412*b* is simply a 2-wire connector, though in other embodiments not depicted, connector 412*b* is configured to receive 3-6 wires, including 3 wires or 4 wires. Although connector 412*a* is described as being a "female" connector, and connector 412*b* is described as being a "male" connector, it will be understood that in other embodiments, connector structure may be exchanged between connectors or connector portions such that connector 412*a* may comprise a male connector and connector 412*b* may comprise a female connector.

In an embodiment, connector 412*b* includes body portion 460, first end 462, which is an insertion end, and second end 464 which is a wire-receiving end. Second end 464 may also include one or more tabs 465, which may be contacted by a user to assist with pushing or pulling connector 412*b*. Connector 412*b* also includes lock portion 466, and defines channels 468 and 470, divided by wall 471. In an embodiment, channels 468 and 470 extend the entire length of body portion 460.

First end 462, in an embodiment, is configured to be inserted into connector 412*a*. In an embodiment, first end 462 includes structure defining a shape complementary to the shapes defined by channels 440 and 442, and thereby first end 462 is insertable into end 434 of connector 412*a*. As depicted, a portion of end 462 defines a complementary circular, cylindrical shape and another portion defines a square shape, to fit into channels 440 and 442, respectively. In an embodiment, first end 462 comprises first side or portion 463 corresponding to the circular, cylindrical shape and configured to fit into channel 440, and second side or portion 465 corresponding to the square-ended shape and configured to fit into channel 442. In one such embodiment, portions 463 and 465 are separated by a space intended to receive wall 443 so as to enable end 462 to fit into end 434.

When connector 412*b* is inserted into connector 412*a*, in an embodiment, channel 468 aligns with channel 440 to form a first continuous channel in the coupled pair of connectors, and channel 470 aligns with channel 442 to form a second continuous channel in the coupled pair of connectors 412*a* and 412*b*. In an embodiment, "continuous" means that portions of channel 468 and channel 440, or portions of 470 and 441, overlap, or share a common space.

Lock portion 466, in an embodiment, comprises a projection or arm having an end that is connected proximal end 464 of clip 412*b*, and having a free end 467 proximal end 462, such that the free end may be moved away from body portion 460. Free end 467 may define an angled surface 469 for contacting, and sliding over lock portion 444 of clip 412*a*.

Also depicted in FIG. 15B is an embodiment of terminal 413*b* connected to a wire 414. In an embodiment, terminal 413*b* is substantially similar to terminal 413*a*, except that terminal 413*b* includes end 415 that may form a pin insertable into channel 452 of terminal 413*a*. In an embodiment, end 415 may include a recess or a slot, such that the end may be expanded or contracted.

As depicted in FIG. 15A, wires 414, including wire 414*a* and 414*b* are connected to terminals 413*b* and inserted into channels 468 and 470.

Figure 16:
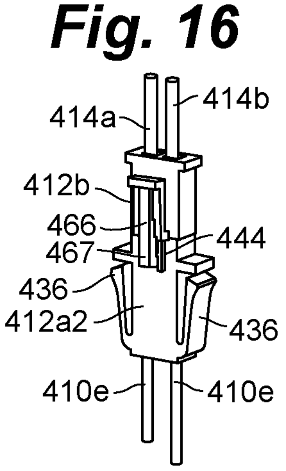
FIG. 16 is a perspective view of the male and female connectors of FIGS. 13B and 15A coupled together.

Referring to FIG. 16, connector 412*a*, specifically a 2-wire connector 412*a*2, is detachably coupled to connector 412*b* by inserting end 462 of connector 412*b* into channels 440 and 442 of end 434 of connector 412*a*. As depicted, lock portion 466 engages 444, thereby detachably coupling connector 412*a*2 to connector 412*b*. A user may disconnect connector 412*a*2 from connector 412*b* by lifting free end 467 away from the connectors, grasping user-grip portions 436, and pulling the connectors apart.

When coupled, each terminal 413*a* makes contact or electrical connection with a corresponding terminal 413*b*. In an embodiment, end 415 of terminal 413*b* is received by recess 452, thereby connecting a terminal 413*a* with a terminal 413*b*. It will be understood that other structures of terminals 413*a* and 413*b* may be used to electrically connect connectors 412*a* and 412*b* and their respective wires. For example, terminals 413*a* and 413*b* may comprise male and female blade terminals, or other times of electrical connectors and terminals, including push-on connectors, electrical quick-disconnect connectors, and so on.

Connection of terminals 413*a* and 413*b* may occur in channels 468, 470, 440, 442, or a combination thereof.

The securement and alignment of wires 414 into connector 412*b* as well as the securement and alignment of wires 410 into connector 412*a*, avoids or reduces torsional forces imparted by twisting of wires 414 or 410 to be transferred from main portion 502 to any of the lighting-extension portions 404, helping keep the structural shape of the decorative lighting, and helping to keep it tangle free.

Consumers also benefit from the detachable feature of connector pair 412*a*/412*b*. Whole lighting-extension portions 404 may be replaced as an assembly by the consumer as needed by uncoupling and coupling simple connectors, rather than replacing individual lamp assemblies, or other wiring.

Further, from a manufacturing point of view, decorative lighting assembly 400 provides significant savings by keeping construction and assembly of main portion 402 separate and distinct from lighting-extension portion 404 (icicle drop portion). In this manner, a generic main portion 402 can be assembled, while different lighting-extension portions 404 may be separately manufactured, and added as needed to main portion 402.

Figure 14A:
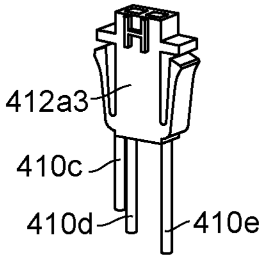
FIG. 14A is a perspective view of an embodiment of a female 3-wire connector and wires, according to an embodiment of the present disclosure.
Figure 14B:
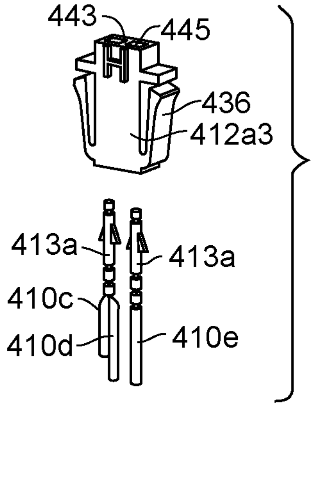
FIG. 14B is a perspective view of the 3-wire connector and wires of FIG. 13A assembled together.

Referring to FIGS. 14A and 14B, an embodiment of connector 412*a*3 is depicted. In an embodiment, connector 412*a*3 is substantially the same as connector 412*a*2, except for channels 443 and 445. In an embodiment, channels 443 and 445 are substantially the same as channels 440 and 442 of connector 412*a*2, except that channels 443 and 445 may be slightly larger or otherwise configured, to each accommodate two wires rather than three wires.

In another embodiment, connectors 412*a*2 and 412*a*3 are identical. In such an embodiment, channels, such as 440 and 443 are large enough to receive two wires, rather than one.

In an embodiment, terminals 413, may have slightly larger ends configured to crimp to wires, such as wires 410*e*, such that one terminal 413 may crimp and connect to two wires 410*e*.

Figure 17:
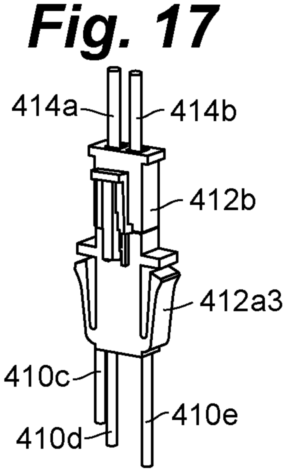
FIG. 17 is a perspective view of the male and female connectors of FIGS. 14A and 15A coupled together.

FIG. 17 depicts connector 412*a*3 coupled to connector 412*b*.

Referring also to FIGS. 12A and 12B, main portion 402 may, in an embodiment, include both 2-wire connectors 412*a* (412*a*2) and 3-wire connectors 412*a* (412*a*3). In an embodiment of main portion 402 having a series of consecutive connectors 412*a* and an end-power connector 408, as depicted, a first connector 412*a* and a last connector 412*a* are both 3-wire connectors 412*a*3, while the intermediate connectors 412*a* comprise 2-wire connectors. In an embodiment, such a configuration is used when lamp assemblies 418 are wired electrically in series.

Figure 18A:
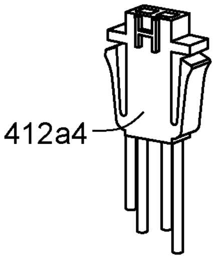
FIG. 18A is a perspective view of a female 4-wire connector assembled with wires, according to an embodiment of the present disclosure.
Figure 18B:
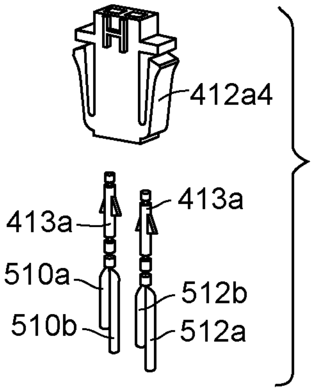
FIG. 18B is a partially exploded view of the connector and wires of FIG. 18A.

FIGS. 18A and 18B depict a 4-wire version of connector 412*a*, namely, connector 412*a*4. In an embodiment, connector 412*a*4 is substantially the same as connector 412*a*2, or the same as connector 412*a*2, but configured to receive four wires, two in each side.

Figure 19:
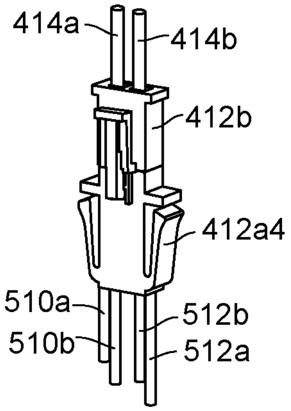
FIG. 19 is a perspective view of the male and female connectors of FIGS. 18A and 15A coupled together.

FIG. 19 depicts connector 412*a*4 detachably connected to connector 412*b*.

As described further below with respect to FIGS. 20 and 21, the use of 4-wire connectors 412*a* facilitate electrical connection of lamps in a parallel configuration.

Figures 20, 21:
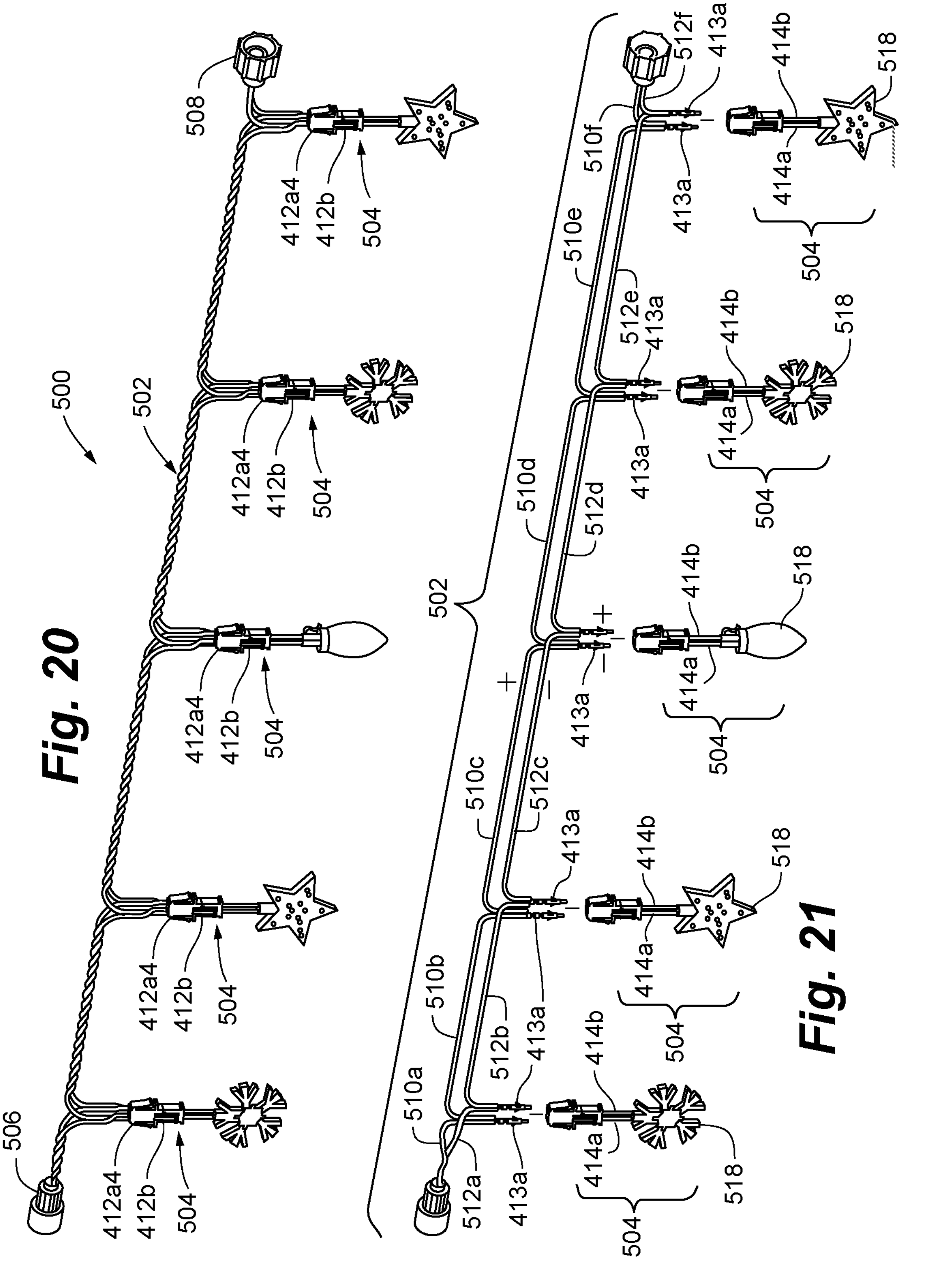
FIG. 20 is a perspective view of another decorative lighting assembly according to an embodiment of the present disclosure.
FIG. 21 is a partially exploded view of the decorative lighting assembly of FIG. 12C.

Referring to FIGS. 20 and 21, an embodiment of decorative lighting assembly 500 is depicted. Decorative lighting assembly 500, in this embodiment, is similar to decorative lighting assembly 400 in many aspects, as will be described below. However, decorative lighting assembly 500 utilizes 4-wire connectors 412*a*, facilitating an electrically parallel connection of lighted-extension portions and lamp assemblies.

In an embodiment, decorative lamp assembly 500 includes main portion 502 and a plurality of lighting-extension portions 504. In an embodiment, main portion 502 extends horizontally, or longitudinally, while lighted-extension portions 504 extend vertically or longitudinally from main portion 502. In an embodiment, lighted-extension portions 504 extend perpendicularly or transversely to main portion 502, when assembled and in a display position.

In an embodiment, main portion 502 includes power plug 506, optional end-power connector 508, main wiring 510, and a plurality of connectors 412*a*.

Power plug 506 may be substantially the same as power plug 406 as depicted and described above, but may alternatively be of the type depicted. In an embodiment, power plug 506 may comprise multiple pin terminals for connecting to a power source, and in an embodiment, may also connect to a controller, or otherwise be configured to receive control or communication signals. In an embodiment, power plug 506 includes an attachment mechanism for coupling to a power source, such as a threaded portion configured to be inserted into a mating threaded cap, or other such attachment mechanism.

End-power connector 508, when present, is configured to connect to another decorative lighting assembly 500 having a plug similar to power plug 506.

Main wiring 510, in an embodiment, comprises a plurality of wires or wire segments. In an embodiment, and as depicted, main wiring 510 includes a first set of wires 510, including: wires 510*a*, 510*b*, 510*c*, 510*d* and 510*e*. Wires 510 are electrically connected to one another, and may be of a first electrical polarity, such as DC positive or AC live or hot. Main wiring 510 also includes a second set of wires 512 electrically connected to one another, including wires 512*a*, 512*b*, 512*c*, 512*d*, 512*e* and 512*f*. Wires 512 may be of a second polarity, such as DC negative or AC neutral. In embodiment, a DC voltage potential exists across wires 510 and 512 when decorative lighting assembly 500 is powered; in another embodiment, an AC voltage potential exists across wires 510 and 512 when decorative lighting assembly 500 is powered.

As depicted, ends of each of wires 510 and 512 are connected to terminals 413*a*, which are configured to be received by connectors 412*a*, which in the embodiment depicted, comprise 4-wire connectors 412*a*4, as described above.

As such, when connected to a power source, each pair of terminals 413*a* provides a voltage potential across the pair of terminals, and therefore at each connector 412*a*4, such that the connectors 412*a*4 are connected electrically in parallel.

Lighting-extension portions 504, in an embodiment, include connector 412*b*, wires 414*a* and 414*b* and one or more lamp assemblies 518. Connectors 412*b* electrically and mechanically connect to connectors 412*a*4 as described above with respect to FIGS. 13A-19.

Lamp assemblies 518 may comprise one, or a plurality of, incandescent or LED lamps electrically connected in parallel or in series. In an embodiment, lamp assemblies may comprise lighted ornaments.

Although embodiments of decorative lighting assemblies 400 and 500 are depicted and described as including connector pairs 412*a* and 412*b*, other connectors and electrical terminals, with other features, may alternatively be used, such as those depicted in FIGS. 22A to 28 and those depicted in FIGS. 29A to 35.

Referring to FIGS. 22A to 28 connectors 612*a* and 612*b* with terminals 613*a* and 613*b* that differ somewhat from connectors 412*a* and 412*b* and terminals 413*a* and 413*b* are depicted. Connectors 612*a* and 612*b* include nearly all of the features of connectors 412*a* and 412*b*, including locking structures, locking terminals, user-grasping or gripping structures, wire-to-terminal connections in the interior of the bodies of the connectors, and so on. However, in embodiments depicted, connectors 612*a* and 612*b* include additional features, as described further below, including structural features that cause electrical connections of individual wires to be made inside connector 612*a*, but at different planes or heights, thereby maximizing distance between wire-to-wire and terminal-to-terminal connection points, and minimizing the chance of unwanted arcing between terminals of dissimilar polarities. It will be understood that connector pair 612*a*/612*b* shares features of connector pair 412*a*/412*b*, unless otherwise described or depicted.

Figure 22A:
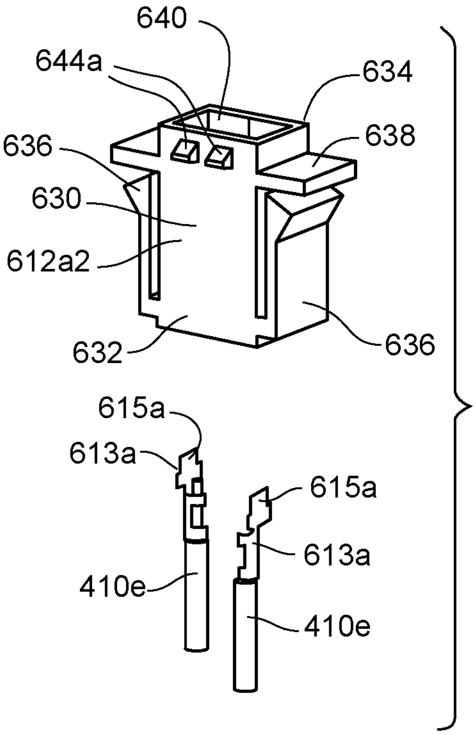
FIG. 22A is a perspective view of an embodiment of a female 2-wire connector and wires, according to an embodiment of the present disclosure.
Figure 22B:
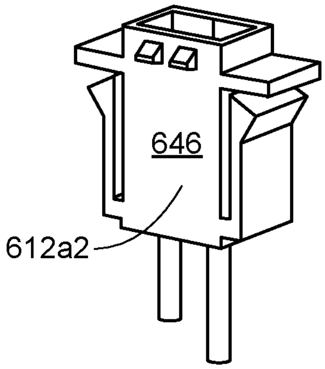
FIG. 22B is a perspective view of the 2-wire connectors and wires of FIG. 13A assembled together.

Referring specifically to FIGS. 22A and 22B, connector 612*a*2 is depicted. In the embodiment depicted, connector 612*a*2 includes body portion 630, first end 632, and second end 634. In an embodiment, body portion 630 includes a pair of user-gripping portions 636 and a pair of tabs 638. User-gripping portions 636, in an embodiment, are configured to be gripped or grasped by a user to assist in separating connector 612*a* and connector 612*b*, and may comprise a pair of projections joined to body portion 630 at first end 632. User-gripping portions 636 may be configured to bend or pivot at their respective connection points to end 632. Optional tabs 638, when present may prevent a user's hand from slipping off of connector 412*a*, when gripping portions 636 and pulling.

First end 632 of connector 612*a* (612*a*2 in this embodiment), defines one or more openings or channels configured to receive terminals 613, including terminals 613*a* and 613*b*, and wires, such as 410*e*.

Second end 634 of connector 612*a* defines a receiving channel 640. Channel 640 may extend through body portion 630 to form the channel in first end 632. In an alternate embodiment, channel 640 defines a single channel near end 634 and two channels near end 632.

As described further below, channel 640 is each configured to receive a portion of connector 612*b*.

In an embodiment, body portion 630 includes lock portion 644*a*, comprising a pair of stops, on surface 646. Lock portion 644*a* is configured to detachably couple to a lock portion of connector 612*b*, as will be described further below.

Still referring to FIGS. 22A and 22B, a pair of terminals 613*a* are attached to a pair of wires 410*e*, respectively. Each terminal 613*a* includes an end portion 615*a*. End portion 615*a* is configured to fit into, and in some embodiments lock to, corresponding structure inside body portion 630, so that wires 410*e* may not be easily pulled out of connector 612*a* after assembly. In an embodiment, end portion 615*a* may generally be flat, with side projections as depicted. Another end portion of terminal 613*a* is configured to crimp to, or otherwise mechanically couple to, a conductor portion of a wire, such as wire 410*e*.

As depicted, terminal 613*a*, and a portion of wire 410*e* is inserted into connector body 630 at end 632, and into channel 640.

Figure 25B:
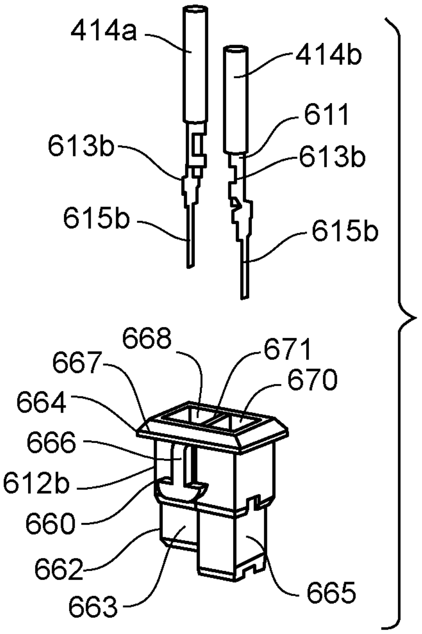
FIG. 25B is a partially exploded view of view of the male 2-wire connector with wires of FIG. 15A.
Figure 25A:
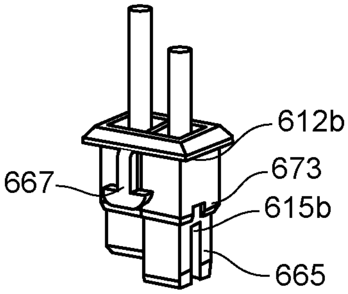
FIG. 25A is a perspective view of a male 2-wire connector and wire assembly for connection to the female connector of FIGS. 22A and 22B.

Referring to FIGS. 25A and 25B, an embodiment of connector 612*b* is depicted. In an embodiment, connector 612*b* is a male connector configured to couple with a female connector, such as connector 612*a*, including connector 612*a*2, and in some embodiments with any of connectors 612*a*2 (2-wire), 612*a*3 (3-wire), or 612*a*4 (4-wire). In an embodiment, connector 612*b* is simply a 2-wire connector, though in other embodiments not depicted, connector 612*b* is configured to receive 3-6 wires, including 3 wires or 4 wires.

In an embodiment, connector 612*b* includes body portion 660, first end 662, which is an insertion end, and second end 664 which is a wire-receiving end. In an embodiment, second end 664 defines flanged portion 667 that extends around a circumference of connector 612*b* and has an outside diameter larger than an outside diameter of body portion 660. Connector 612*b* also includes lock portion 666, and defines channels 668 and 670, separated by wall 671. In an embodiment, channels 668 and 670 extend the entire length of body portion 460.

First end 662, in an embodiment, is configured to be inserted into connector 612*a*. In an embodiment, first end 662 includes structure defining a shape complementary to channel 640, and thereby first end 662 is insertable into end 634 of connector 612*a*. In an embodiment, first end 662 comprises first side or portion 663 and second side or portion 665 both configured to fit into channel 640.

In an embodiment, and as depicted, each of first portion 663 and second portion 665 form side-by-side box shapes, or rectangular cuboids. In an embodiment, second portion 665 extends further away from end 662 as compared to first portion 663, and channels 668 and 670 extend respectively through first and second portions 663 and 665. In an embodiment, first portion 663 and second portion 665 define end diameters that are different. In one such embodiment, an end diameter of first portion 663 is smaller than that of second portion 665.

In an embodiment, first end 662 comprising first portion 663 and second portion 665 is narrower than second end 664, as depicted. A narrowing between ends 662 and 664 may occur at transition portion 673, which forms an angled portion. In an embodiment, the narrowing of end 662 leaves space for ends 615*b* of terminal 613*b* to be bent upwards and positioned adjacent first portion 663 and second portion 665, respectively, as described further below.

Lock portion 666, in an embodiment, comprises a projection or arm that is connected proximal end 464 of clip 412*b*, and having a free end 667 distal end 664, such that the free end may be moved away from body portion 660 and positioned adjacent stop tabs 644*a* of connector 612*a*2.

Also depicted in FIG. 25B is an embodiment of terminal 613*b* connected to a wire 414. In an embodiment, terminal 413*b* is substantially similar to terminal 413*a*, except that terminal 413*b* includes end 415*b* that extends downwardly and away from an opposite crimping end 611.

In an embodiment, a terminal 613*b* attached to a wire 414, such as wire 414*a*, is inserted into channel 668, such that end 615*b* projects outside channel 668 at first end 662, then is bent around an edge of first end 662, projecting upwardly, parallel to, and adjacent to, an outside surface of first portion 663 (not depicted, but substantially the same as depicted for terminal 613*b* and second end 665, which is depicted). In an embodiment, a portion of end 615*b* contacts ridge 673, and is bent at another point so that the tip of end 615*b* projects slightly outwardly and away from the outside surface of first portion 663.

Similarly, in an embodiment, a terminal 613*b* attached to a wire 414, such as wire 414*b*, is inserted into channel 670, such that end 615*b* projects outside channel 670 at second end 664, then is bent around an edge of second end 664, projecting upwardly, parallel to, and adjacent to, an outside surface of second portion 665. In an embodiment, end 615*b* is bent 180°. In an embodiment, a portion of end 615*b* contacts ridge 673, and is bent at another point so that the tip of end 615*b* projects slightly outwardly and away from the outside surface of second portion 665. The bend at the tip of end 615*b* may assist in securing terminal 613*b* in connector 412*a*2.

Figure 26:
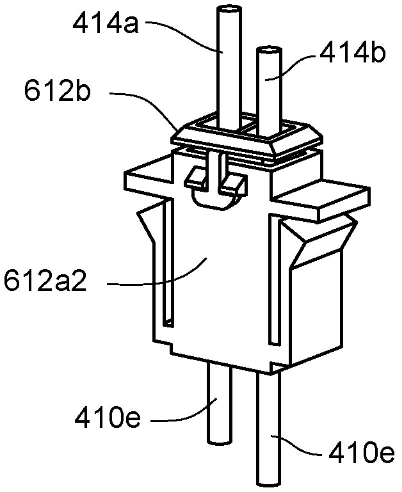
FIG. 26 is a perspective view of the male and female connectors of FIGS. 22A and 25A coupled together.

Referring to FIG. 26, connector 612*a*, specifically a 2-wire connector 612*a*2, is detachably coupled to connector 612*b* by inserting end 662 of connector 612*b* into channel 640 of end 634 of connector 612*a*. As depicted, lock portion 666 engages lock portion stop tabs 644*a*, thereby detachably coupling connector 612*a*2 to connector 612*b*. A user may disconnect connector 612*a*2 from connector 612*b* by lifting free end 667 away from the connectors, grasping user-grip portions 636, and pulling the connectors apart.

When coupled, each terminal 613*a* makes contact or electrical connection with a corresponding terminal 613*b*. In an embodiment, an exposed end 615*b* of terminal 613*b* (the end or portion adjacent an outside surface of first portion 663 or second portion 665) is positioned adjacent a corresponding end 615*a* of a terminal 613*a*, thereby making an electrical connection between pairs of terminals 613*a* and 613*b* inside connector 612*a*2.

Because first portion 663 is shorter, or does not project as far from end 664 as compared to second portion 664, terminal 613*a* and terminal 613*b* adjacent first portion 663 make electrical connection closer to second end 664 as compared to terminals 613*a* and 613*b* adjacent second portion 665. This structure that results in electrical contact points positioned at different longitudinal or vertical positions within connector 612*a*2 aids in reducing accidental arcing between terminals adjacent first portion 663 and second portion 665.

Figure 32A:
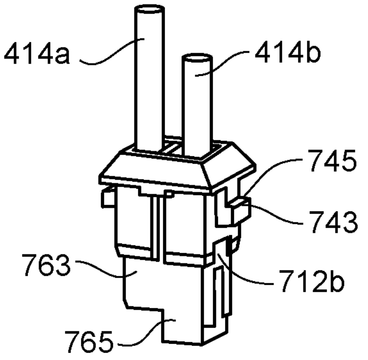
FIG. 32A is a perspective view of a male 2-wire connector and wire assembly for connection to the female connector of FIGS. 29A and 29B.
Figure 32B:
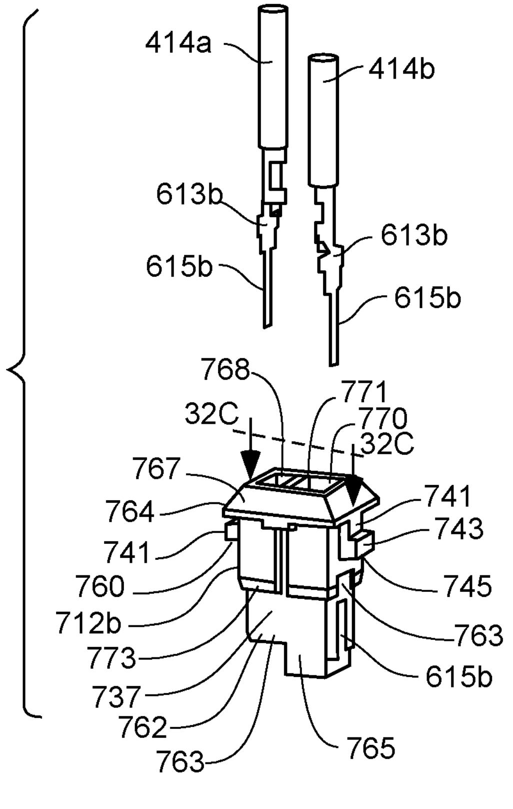
FIG. 32B is a partially exploded view of view of the male 2-wire connector with wires of FIG. 15A.
Figure 32C:
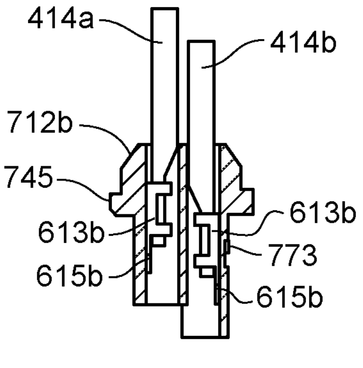
FIG. 32C is a sectional view of the male 2-wire connector of FIG. 32A with wires inserted.
Figure 33A:
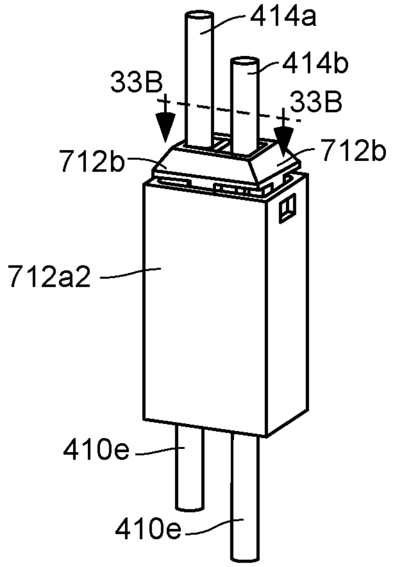
FIG. 33A is a perspective view of the male and female connectors of FIGS. 29A and 32A coupled together.
Figure 33B:
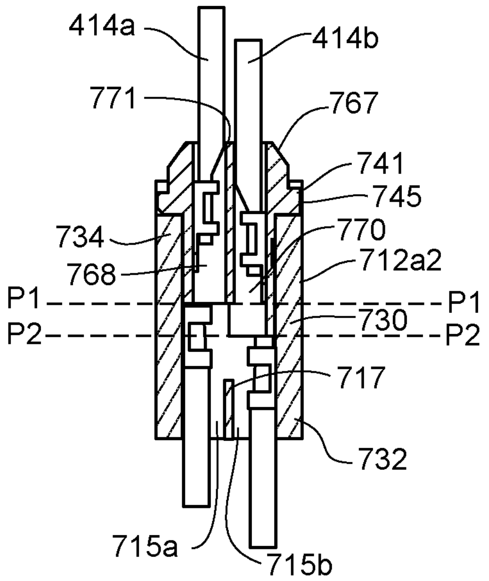
FIG. 33B is a section view of the coupled connectors of FIG. 33A, with wires not depicted in sectional view.

FIGS. 32C and 33B depict coupling of connectors 712*a* and 712*b*, which are similar to connectors 612*a* and 612*b*, provide cross sectional views depicting the concept of longitudinally shifted electrical connection points.

Figure 23A:
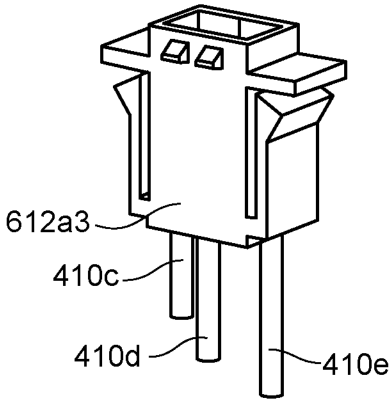
FIG. 23A is a perspective view of a 3-wire connector assembled to wires, according to an embodiment of the present disclosure.
Figure 23B:
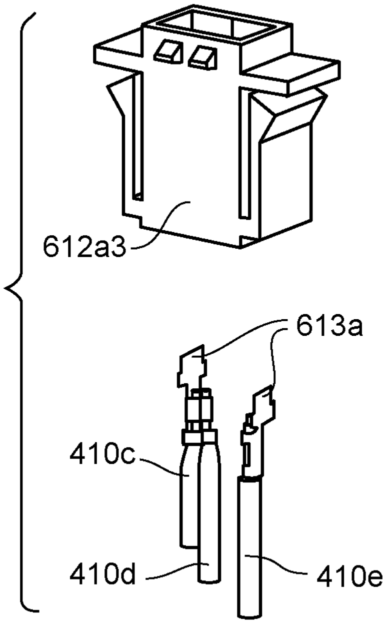
FIG. 23B is a partially exploded view of the embodiment of the female 3-wire connector and wires of FIG. 23A.

Referring to FIGS. 23A and 23B, an embodiment of connector 612*a*3 is depicted. In an embodiment, connector 612*a*3 is substantially the same as connector 612*a*2. In an embodiment, channel 640 may be modified to accommodate three wires instead of two wires.

Figure 24A:
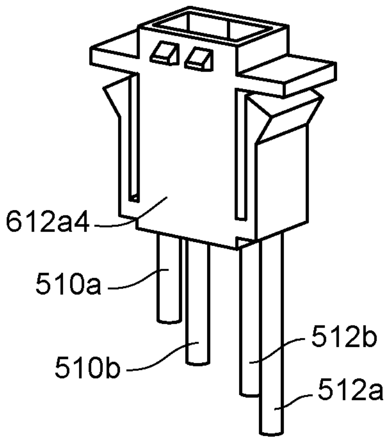
FIG. 24A is a perspective view of a female 4-wire connector assembled with wires, according to an embodiment of the present disclosure.
Figure 24B:
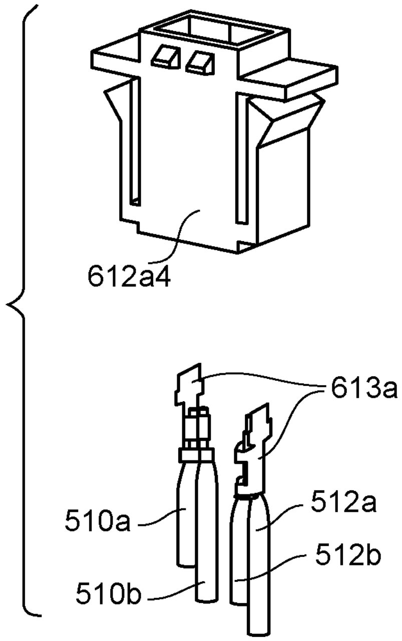
FIG. 24B is a partially exploded view of the connector and wires of FIG. 24A.

FIGS. 24A and 24B depict a 4-wire version of connector 612*a*, namely, connector 612*a*4. In an embodiment, connector 612*a*3 is substantially the same as connector 612*a*2. In an embodiment, channel 640 may be modified to accommodate four wires instead of two wires.

Figure 27:
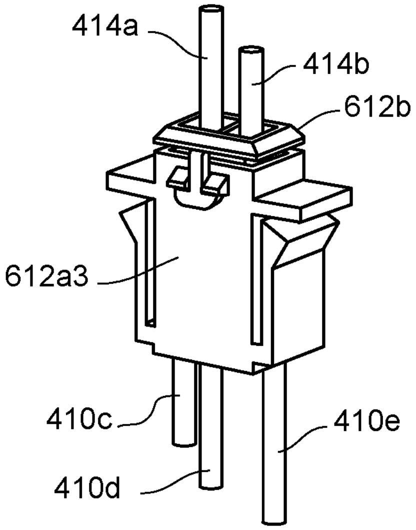
FIG. 27 is a perspective view of the male and female connectors of FIGS. 23A and 25A coupled together.
Figure 28:
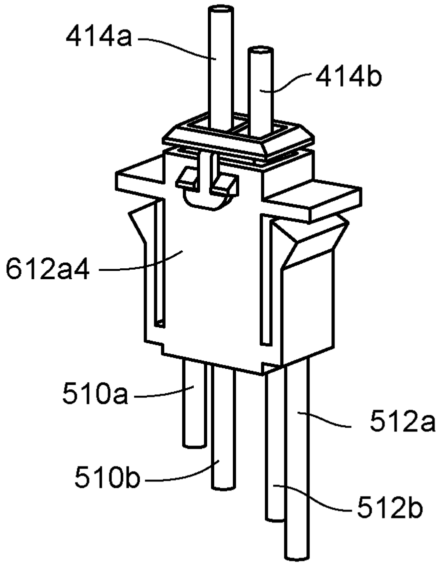
FIG. 28 depicts the male and female connectors of FIGS. 24A and 25A coupled together.

FIGS. 26-28 depict connectors 612*a*2, 612*a*3, and 612*a*4 detachably connected to connectors 412*b*, respectively.

Referring to FIGS. 29A to 35, another embodiment of a pair of connectors similar to connectors 412*a*/412*b* and 612*a*/612*b*, is depicted. Connector pair 712*a* and 712*b* is very similar to connector pair 612*a*/612*b*, sharing features of connector pair 612*a*/612*b*, unless otherwise described or depicted.

Figure 29A:
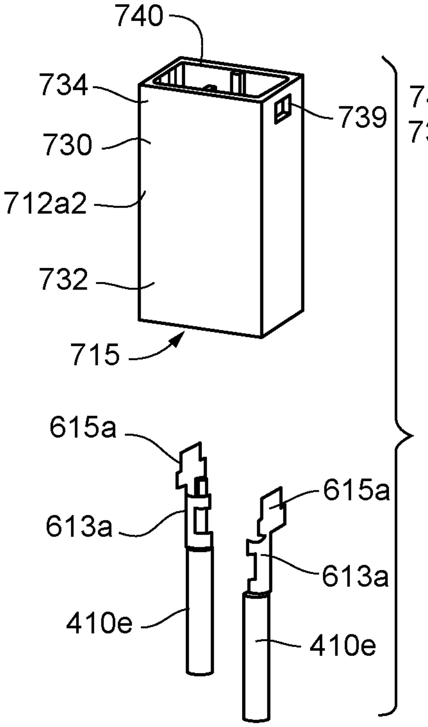
FIG. 29A is a perspective view of an embodiment of a female 2-wire connector and wires, according to an embodiment of the present disclosure.
Figure 29B:
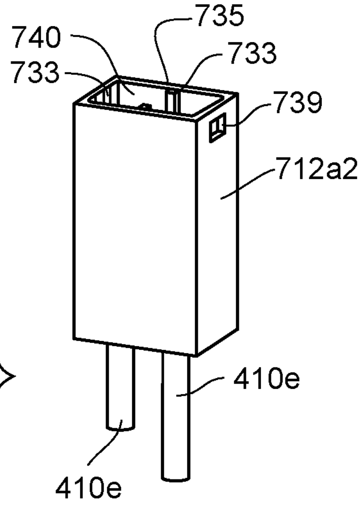
FIG. 29B is a perspective view of the 2-wire connectors and wires of FIG. 29A assembled together.
Figure 29C:
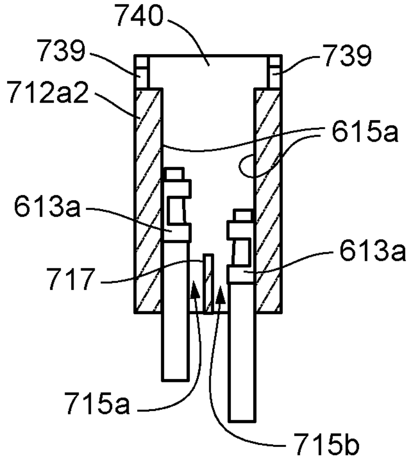
FIG. 29C is a cross-sectional view of the connector and wires of FIG. 29B.

Referring specifically to FIGS. 29A, 29B and 29C, connector 712*a*2 is depicted. In the embodiment depicted, connector 712*a*2 includes body portion 730, first end 732, and second end 734.

First end 732 of connector 712*a* (712*a*2 in this embodiment), defines one or more openings or channels 715 configured to receive terminals 713, including terminals 713*a* and 713*b*, and wires, such as 410*e*. In the embodiment depicted, first end 732 defines two channels, channels 715*a* and 715*b*, separated by wall 717. Wall 717, in an embodiment, projects only partially into body portion 730, and assists in keeping wires and terminals positioned inside body portion 730.

Second end 734 of connector 712*a*2 defines a receiving channel 740. Channel 740 may extend through body portion 730 to channels 715*a* and 715*b*. In an alternate embodiment, body portion 730 and its second end 734 form only a portion of a single channel 740, and do not define separate, additional channels 715*a* and 715*b*. As described further below, channel 740 is each configured to receive a portion of connector 612*b*.

Second end 732, in an embodiment, also includes internal surface structure 733 for aligning and positioning 712*b* in receiving channel 740. In an embodiment, internal surface structure 733 includes vertical or longitudinal alignment ridge 735 projecting radially inward and extending longitudinally, vertically, or axially (with respect to an inserted wire axis). Alignment ridge 735 may be configured to be received by a corresponding slot or channel 737 on connector 712*b*. In an embodiment, alignment structure 733 may also include recesses in an inside surface of body portion 730.

In an embodiment, second end 734 of body portion 730 defines one or more lock openings 739, each configured to receive a portion of a locking projection or arm 741 of connector 712*b*, as described further below, for locking connector 712*b* into connector 712*a*2.

A pair of terminals 613*a* is attached to a pair of wires 410*e*, respectively. Each terminal 613*a* includes an end portion 615*a*. End portion 615*a* is configured to fit into, and in some embodiments lock to, corresponding structure inside body portion 730, so that wires 410*e* may not be easily pulled out of connector 712*a*2 after assembly. In an embodiment, end portion 615*a* may generally be flat, with side projections as depicted. Another end portion of terminal 613*a* is configured to crimp to, or otherwise mechanically couple to, a conductor portion of a wire, such as wire 410*e*.

As depicted, terminals 613*a*, and a portion of wires 410*e* are inserted into connector body 730 at end 732, and into and through channels 715*a* and 715*b*, and into channel 740.

Referring to FIGS. 32A, 32B and 32C, an embodiment of connector 712*b* is depicted. In an embodiment, connector 712*b* is a male connector configured to couple with a female connector, such as connector 712*a*, including connector 712*a*2, and in some embodiments with any of connectors 712*a*2 (2-wire), 712*a*3 (3-wire), or 712*a*4 (4-wire). In an embodiment, connector 712*b* is simply a 2-wire connector, though in other embodiments not depicted, connector 712*b* is configured to receive 3-6 wires, including 3 wires or 4 wires.

In an embodiment, connector 712*b* includes body portion 760, first end 762, which is an insertion end, and second end 764 which is a wire-receiving end. In an embodiment, second end 764 defines flanged portion 767 that extends around a circumference of connector 612*b* and has an outside diameter larger than an outside diameter of body portion 760. In an embodiment, connector 712*b* also includes a pair of lock portions 741, which may be arms attached proximal second end 734 having a free end 743. Free end 743 may include end portion 745 configured to be received in lock openings 739 of connector 712*a*2.

In an embodiment, 712*a*2 and body portion 730 defines channels 768 and 770, separated by wall 771. In an embodiment, channels 668 and 670 extend the entire length of body portion 460.

First end 762, in an embodiment, is configured to be inserted into connector 612*a*. In an embodiment, first end 762 includes structure defining a shape complementary to channel 740, and thereby first end 762 is insertable into end 734 of connector 712*a*2. In an embodiment, first end 762 comprises first side or portion 763 and second side or portion 765 both configured to fit into channel 740.

In an embodiment, and as depicted, each of first portion 763 and second portion 765 form side-by-side box shapes, or rectangular cuboids. In an embodiment, second portion 765 extends further away from end 762 as compared to first portion 763, and channels 768 and 770 extend respectively through first and second portions 763 and 765. In an embodiment, first portion 763 and second portion 765 define end diameters that are different. In one such embodiment, an end diameter of first portion 763 is smaller than that of second portion 665.

In an embodiment, first end 762 comprising first portion 763 and second portion 765 is narrower than second end 664, as depicted. A narrowing between ends 762 and 764 may occur at transition portion 773, which forms an angled portion. In an embodiment, the narrowing of end 762 leaves space for ends 615*b* of terminal 613*b* to be bent upwards and positioned adjacent first portion 763 and second portion 765, respectively, as described further below.

In an embodiment, a terminal 613*b* attached to a wire 414, such as wire 414*a*, is inserted into channel 768, such that end 615*b* projects outside channel 768 at first end 762, then is bent around an edge of first end 762, projecting upwardly, parallel to, and adjacent to, an outside surface of first portion 763 (not depicted, but substantially the same as depicted for terminal 613*b* and second end 765, which is depicted). In an embodiment, a portion of end 615*b* contacts ridge 773, and is bent at another point so that the tip of end 615*b* projects slightly outwardly and away from the outside surface of first portion 763.

Similarly, in an embodiment, a terminal 613*b* attached to a wire 414, such as wire 414*b*, is inserted into channel 770, such that end 615*b* projects outside channel 770 at second end 764, then is bent around an edge of second end 764, projecting upwardly, parallel to, and adjacent to, an outside surface of second portion 765. In an embodiment, a portion of end 615*b* contacts ridge 773, and is bent at another point so that the tip of end 615*b* projects slightly outwardly and away from the outside surface of second portion 765. The bend at the tip of end 615*b* may assist in securing terminal 613*b* in connector 712*a*2.

Referring to FIGS. 33A and 33B, a connector 712*a*, specifically a 2-wire connector 712*a*2, is detachably coupled to connector 712*b* by inserting end 762 of connector 712*b* into channel 740 of end 734 of connector 712*a*2. As depicted, end portions 745, which project transversely to body portion 730, are received by lock openings 739, thereby locking connector 712*b* to connector 712*a*2. In this embodiment, only a small portion of free end 743 of arm 741, i.e., a portion of end 745 projects out of a lock opening 739, such that a user cannot easily disconnect or detach connector 712*b* from connector 712*a*2, without using a tool of some sort to press end 745 into channel 740 before pulling apart. Such a configuration ensures that the connectors are not easily detached from one another, thereby exposing potentially live electrical conductors. Such a configuration enhances the safety of the decorative light assembly, such as decorative light assemblies 400 and/or 500.

When coupled, each terminal 613*a* makes contact or electrical connection with a corresponding terminal 613*b*. In an embodiment, an exposed end 615*b* of terminal 613*b* (the end or portion adjacent an outside surface of first portion 663 or second portion 665) is positioned adjacent a corresponding end 615*a* of a terminal 613*a*, thereby making an electrical connection between pairs of terminals 613*a* and 613*b* inside connector 712*a*2.

Similar to connector pair 612*a*2/612*b*, because first portion 763 is shorter, or does not project as far from end 764 as compared to second portion 764, terminal 613*a* and terminal 613*b* adjacent first portion 763 make electrical connection closer to second end 764 as compared to terminals 613*a* and 613*b* adjacent second portion 765. This structure that results in electrical contact points positioned at different longitudinal or vertical positions within connector 712*a*2 aids in reducing accidental arcing between terminals adjacent first portion 763 and second portion 765. As depicted, electrical connection between first portion 763 terminals occurs at or above plane P1, while electrical connection between first portion 765 terminals occurs at or above plane P2. In an embodiment, and as depicted, plane P1 is a horizontal plane defined at an end of first portion 763, while plane P2 is a horizontal plane defined at an end of second portion 765.

Another feature of connector pair 712*a*/712*b* is that wall 771 provides an insulative barrier between terminal ends 615*a* of first and second portions 763 and 765, thereby reducing the chance of arcing between terminals of opposite polarity.

Figure 30B:
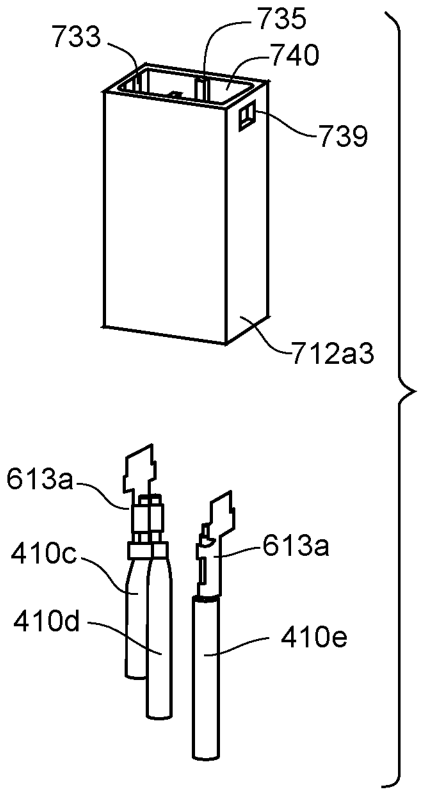
FIG. 30B is a partially exploded view of the embodiment of the female 3-wire connector and wires of FIG. 30A.
Figure 30A:
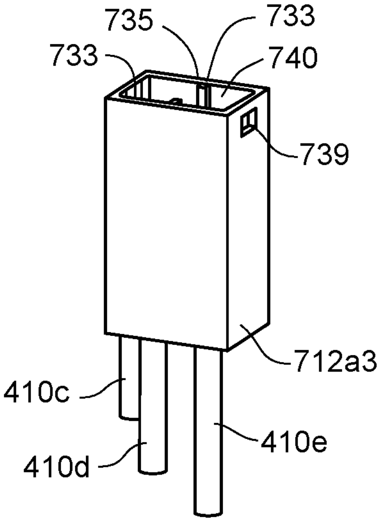
FIG. 30A is a perspective view of a 3-wire connector assembled to wires, according to an embodiment of the present disclosure.

Referring to FIGS. 30A and 30B, an embodiment of connector 712*a*3 is depicted. In an embodiment, connector 612*a*3 is substantially, or exactly, the same as connector 712*a*2. In an embodiment, channel 740 may be modified, including enlarging body portion 730, to accommodate three wires instead of two wires.

Figure 31A:
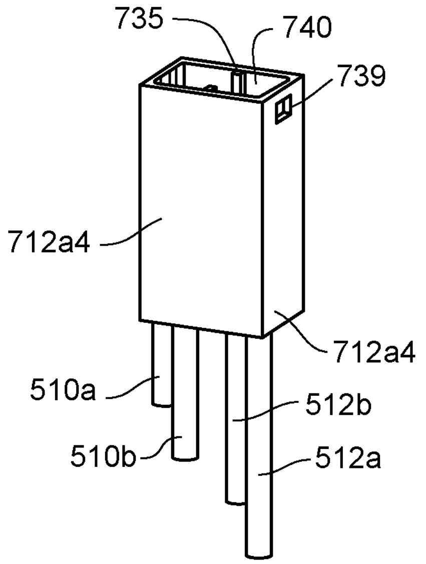
FIG. 31A is a perspective view of a female 4-wire connector assembled with wires, according to an embodiment of the present disclosure.
Figure 31B:
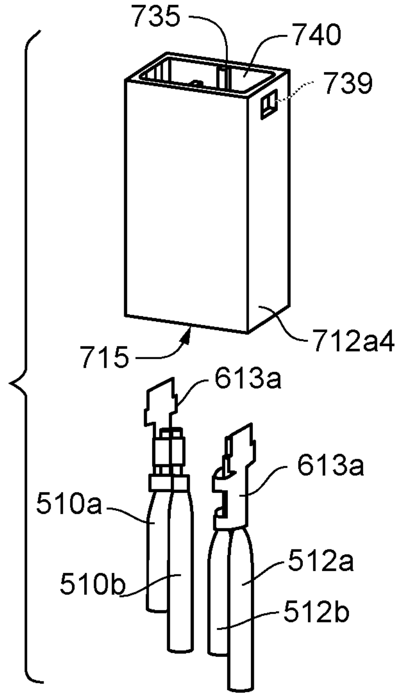
FIG. 31B is a partially exploded view of the connector and wires of FIG. 24A.

FIGS. 31A and 31B depict a 4-wire version of connector 712*a*, namely, connector 712*a*4. In an embodiment, connector 712*a*4 is substantially the same as connector 712*a*2. In an embodiment, channel 740 may be modified to accommodate four wires instead of two wires.

Figure 34:
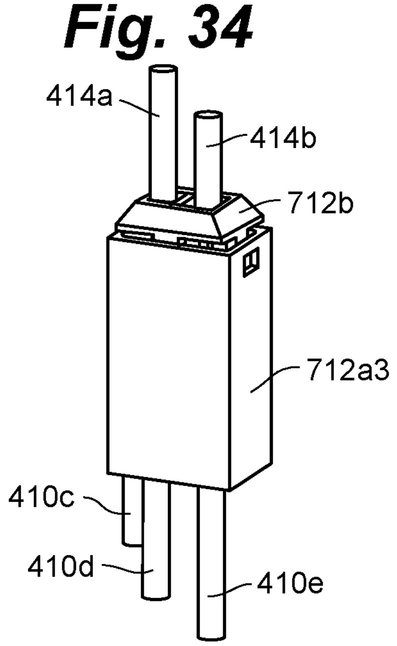
FIG. 34 is a perspective view of the male and female connectors of FIGS. 31A and 32A coupled together.
Figure 35:
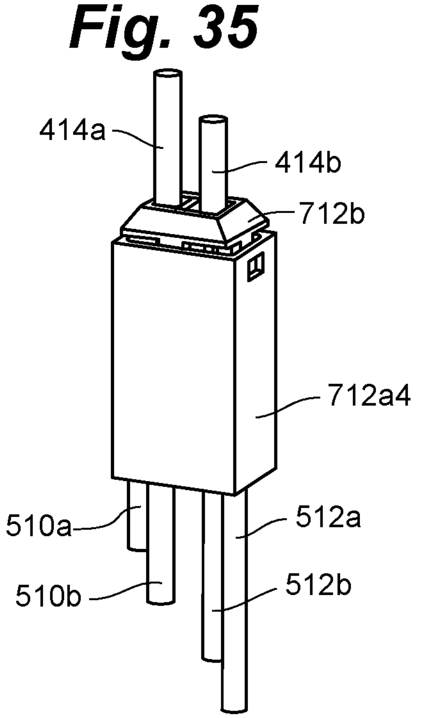
FIG. 35 is a perspective view of the male and female connectors of FIGS. 31A and 32A coupled together.

FIGS. 34-35 depict connectors 712*a*2, 712*a*3, and 712*a*4 detachably connected to connectors 712*b*, respectively.

As described above in detail, any of connector pairs 412*a*/412*b*, 612*a*/612*b* or 712*a*/712*b* may be used with decorative lighting assemblies 400 and 600.

Figure 36:
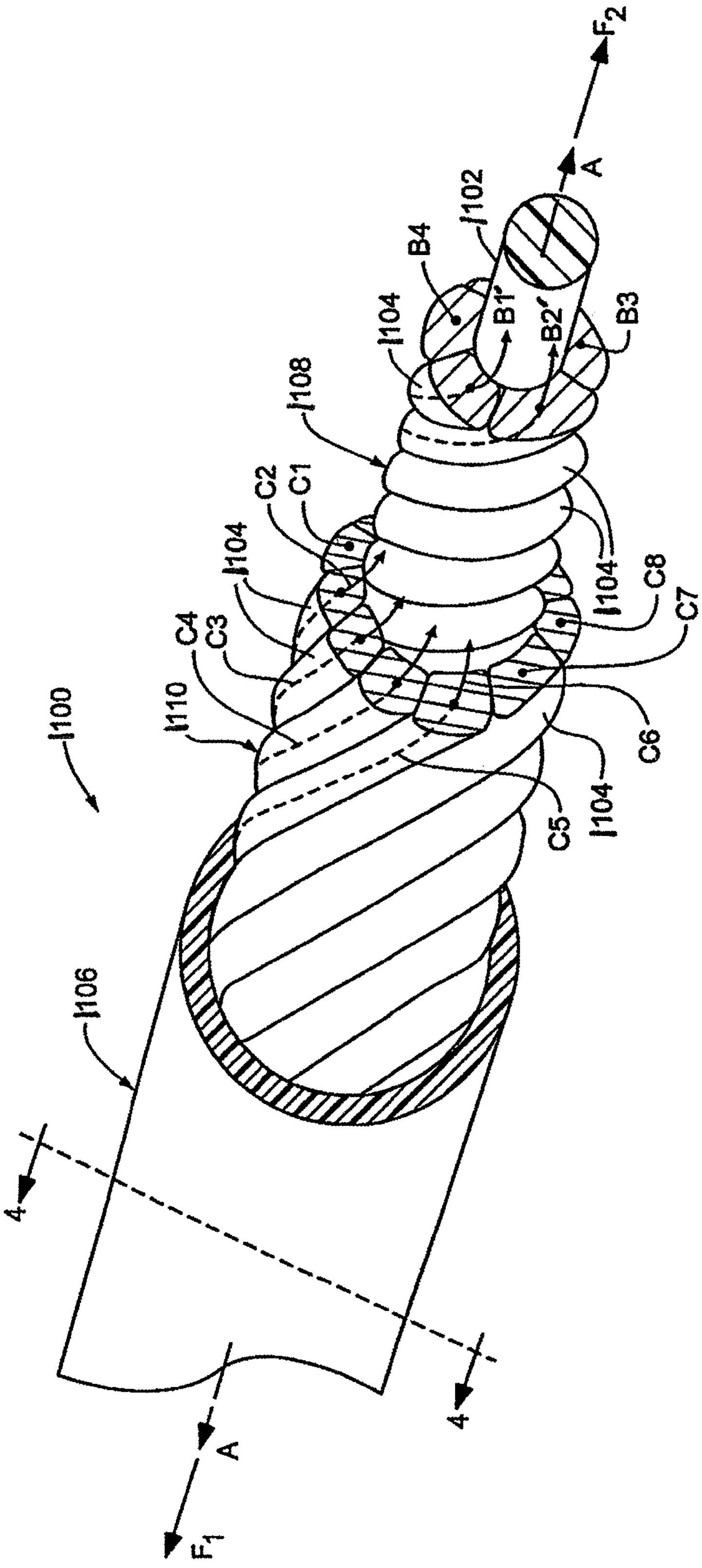
FIG. 36 is a perspective view of a reinforced decorative wire, according to an embodiment of the claimed invention.

Referring to FIG. 36, an embodiment of reinforced decorative-lighting wire or cord 1100 is depicted. In an embodiment, reinforced decorative-lighting wire 1100 includes one or more reinforcing strands or threads 1102, one or more conductor strands 1104, and insulating layer or jacket 1106. Conductor strands 1104 may form one or more layers, such as the depicted first conductor layer 1108 and second conductor layer 1110. As will be described further below, reinforcing strands 1102 and conductor strands 1104 may be arranged in a variety of manners, and in a variety of quantities, dependent upon a number of factors, including desired wire properties, including, but not limited to, tensile strength, resistivity and conductivity.

Reinforced decorative-lighting wire 1100 may comprise a variety of sizes, resistances, and ampacities, and may be described in terms of electrically-equivalent wire gauge standards, e.g., 20 AWG (American Wire Gauge), 22 AWG, 24 AWG, etc. For example, in an embodiment, wire 1100 may comprise a conductive equivalent to a wire normally described as a 22 AWG wire having an equivalent cross sectional area of conductive copper of approximately 0.326 mm2 and having a typical resistance of approximately 52.96 ohms/km, though the overall diameter of the complete wire may be greater than a standard 22 AWG wire due to the additional reinforcing strands.

Reinforced decorative-lighting wire 1100 may also be described in terms of other equivalent wire standards, such as Underwriter's Laboratories Standard UL 62 insofar as it pertains to decorative-lighting wire, including standards directed to Type XTW or Type CXTW as typically used in decorative-lighting applications. For example, an embodiment of a reinforced decorative-lighting wire 1100 may be designed to include characteristics equivalent to selected characteristics of an 18, 20 22, 25, or 25 AWG CXTW wire, particularly conductive characteristics such as DC resistance per conductor strand, and insulative characteristics.

As depicted in FIG. 36, an embodiment of reinforced decorative-lighting wire 1100 comprises a single reinforcing strand 1102, and multiple conductor strands 1104. In an embodiment, conductor strands 1104 form two layers: first conductor layer 1108 and second layer 1110, though it will be understood that conductors 1104 may form one, two, or more than two layers. Layers 1108 and 1110 form a stranded conductor of reinforced wire 1100. A reinforced wire 1100 having the stranded conductor comprising multiple conductor strands 1104 may also be referred to as a "single" conductor reinforced wire 1100 to differentiate from standard twisted pairs of wires typically used in decorative lighting. However, it will be understood that in some applications, pairs of single-conductor reinforced wires 1100 may be twisted about one another to form reinforced twisted-pair wire sets.

In an embodiment, and as depicted, reinforcing strand 1102 extends axially along a length of wire 1100, and along central wire Axis A, surrounded by, or adjacent to, conductor strands 1104. In an embodiment, reinforcing strand 1102 is generally located radially at a center of wire 1100.

Reinforcing strand 1102 may define a generally cylindrical shape defining a circular cross-sectional area, though the cross-sectional area may define other shapes, such as square, oval, rectangular, and so on. In other embodiments, and as will be described further below with respect to FIGS. 4B and 9A-13B, reinforcing strand 1102 may define a generally circular cross-sectional shape prior to assembly into wire 1100, but then define a different, shape, such as an asymmetrical shape, after a manufacturing assembly process.

In an embodiment, central reinforcing strand 1102 comprises one or more fibers or strands of fibrous reinforcing material. In the depicted embodiment, reinforcing strand 1102 comprises a single strand or fiber of reinforcing material. In other embodiments, reinforcing strand 1102 comprises multiple strands of reinforcing material that may comprise twisted strands, threads or fibers such that reinforcing strand 1102 comprises a yarn of multiple strands or fibers.

In the embodiment depicted, reinforcing strand 1102 comprises a single 1500 Denier fiber having an outside diameter of approximately 0.45 mm. In another embodiment, reinforcing strand 1102 comprises a fiber ranging from 500 Denier to 2500 Denier. In other embodiments, reinforcing strand 1102 may comprise a larger or smaller diameter and/or greater or lesser Denier fiber depending on the properties of the reinforcing material and desired reinforcing properties. In an embodiment, reinforcing strand 1102 comprises a single or multi-fiber strand sized to be within the range of 1000 to 1500 Denier. Reinforced wire 1100 with reinforcing strands 1102 comprising such a size may provide appropriate reinforcing strength for wires 1100 that most decorative lighting applications that would typically use an 118-24 AWG standard wire.

The reinforcing material of reinforcing strand 1102 may comprise a generally non-conductive or nonmetallic material, such as a plastic or polymer, including a polyester or polyethylene (PE) material. In one such embodiment, reinforcing strand 1102 comprises a polyethylene terephthalate (PET) material. Other reinforcing materials may include, though will not be limited to, polystyrene, polyvinyl chloride (PVC), polyamide (PA), and so on. Reinforcing strand 1102 may consist entirely or substantially of a non-conductive or nonmetallic material, such as PET, though in some embodiments, reinforcing strand 1102 may comprise a composite material. Such a composite material may comprise a non-conductive material, such as PET, as well as some other conductive, partially-conductive, or other non-conductive material.

In an embodiment, and as depicted, reinforcing strand 1102 comprises a substantially solid structure in cross section (radially), as compared to a hollow core strand such as a pipe or other annular shape. Further, in an embodiment, reinforcing strand 1102 comprises the same material continuously along its axial length. In an embodiment, reinforcing strand 1102 may have a hardness that is less than a hardness of a conductor strand 1104. In an embodiment, reinforcing strand 1102 has a Rockwell hardness of R117.

In an embodiment, reinforcing strand 1102 comprises primarily a PET material, having a specific gravity ranging from 1380-1405 kg/m3, and a melting point of 200-250 degrees Celsius. In other embodiments, reinforcing strand 1102 comprises a polymer having a specific gravity that ranges from 1000-2000 kg/m3, and a melting point of 1150-300 degrees Celsius. Material in such a range may provide an appropriate balance of strength and flexibility for decorative light string applications. Further, as will be explained further below, such properties allow for deformation of reinforcing strand 1102 during the manufacturing assembly process.

In an embodiment, wherein reinforcing strand 1102 comprises primarily a PET material, strand 1102 comprises an elongation at break of 300%, or may comprise an elongation range of 200% to 400%, and a tensile strength of 55 MPa (7,977 psi). Herein, tensile strength refers to its ordinary meaning as understood in the field of conductive wires, including tensile strength being the maximum amount of stress that wire 1100 can withstand before failing or breaking, while being stretched or pulled axially along axis A (along a length of wire 1100) by opposing axial forces labeled F1 and F2 in FIG. 36.

In another embodiment wherein strand 1102 comprises a PET material, an elongation property of strand 1102 ranges from 200% to 400%, and a tensile strength ranges from 45 to 65 MPa. In an embodiment, the elongation of strand 1102 may be less than an elongation of conductor strand 1104. In another embodiment, the elongation of a strand 1102 may be approximately the same as, or greater than, a conductor strand 1104. In an embodiment, the tensile strength of a strand 1102 may be less than the tensile strength of a conductor strand 1104. In another embodiment, the tensile strength may be approximately the same as, or greater than, a conductor strand 1104. In an embodiment, the elongation of a strand 1102 may be less than the overall elongation of reinforced wire 1100. In another embodiment, the elongation may be approximately the same as, or greater than, reinforced wire 1100. In an embodiment, the tensile strength of a strand 1102 may be less than the overall tensile strength of reinforced wire 1100. In another embodiment, the tensile strength may be approximately the same as, or greater than, reinforced wire 1100.

Conductor strands 1104 may comprise any number of known conductive materials, including metals and metal alloys, such as copper, aluminum, steel, nickel, aluminum, and so on. Embodiments of alloys may include copper aluminum alloy, copper steel alloy, and so on. In an embodiment, one or more conductor strands comprise soft-annealed copper strands, which may be uncoated, or in some embodiments, coated with tin. Conductor strands 1104 comprised of copper, including comprised primarily of copper, provide not only superior tensile strength, but also superior ductility properties as compared to conductor strands 1104 comprising other metals, such as aluminum. A relatively higher ductility deriving from the use of copper conductor strands 1104, in combination with a polymer reinforcing strand 1102, allows deformation, particularly elongation when wire 1100 is subjected to tensile stress. Such a feature provides advantages in decorative lighting. In contrast, stranded conductors commonly used in overhead power line applications typically rely on aluminum conductors having low ductility, resulting in low elongation. In such an application, sagging of the heavy power lines/conductors is a concern, and the desirable low ductility or inability to elongate, is an important consideration. On the other hand, in decorative lighting, the ability of a wire to deform or elongate (relatively high ductility, e.g., the ductility of copper) may be advantageous. For example, when subjected to a tensile stress or force, wire 1100 may elongate rather than break, thereby preventing exposure of conductor strands 1104, and preventing a potentially hazardous situation. Elongation properties of reinforced decorative lighting wire 1100 are discussed further below.

Further, properties of high tensile strength, flexibility, and the ability to stretch or elongate when subjected to axial pulling may be advantageous for reinforced wire 1100 when applied to a decorative lighting apparatus. Unlike cables and wires used in overhead power transmission applications, wires used in decorative lighting applications tend to be supported over much of their length. For example, decorative light strings applied to trees, such as Christmas trees, are generally affixed to the branches of the tree and are well supported, with only very short runs of wire that are unsupported. Conversely, in overhead power transmission applications, extremely long lengths of wire are unsupported between power poles. Consequently, the materials and properties of cables and wires for such power transmission applications may be significantly different than those of reinforced decorative lighting wire 1100 as described herein.

In addition to ductility, tensile strength of conductor strands 1104 and associated conductor layers 1106 and 1108, as well as overall tensile strength of reinforced wire 1100 remains a consideration. In an embodiment of reinforced wire 1100 comprising soft-annealed copper conductor strands 1104, a tensile strength of each copper strand 1104 will have a higher tensile strength, for example, ranging from 200-250 N/mm2, as compared to aluminum alloys, for example, 100 N/mm2. In an embodiment, each conductor strand 1104 has a tensile strength that is less than a tensile strength of reinforcing strand 1102. In one such embodiment, conductor strands 1104 comprise a copper material, and reinforcing strand 1102 comprises PET.

In an embodiment, each conductor strand 1104 comprises a continuous, solid-core strand, though the entire wire 1100 comprises a multi-stranded wire. In other embodiments, each conductor strand 1104 may comprise multiple, individual strands. In an embodiment, all strands have approximately the same average diameter.

In a stranded conductor embodiment of wire 1100, individual conductor strands comprise 27 to 36 AWG copper conductor strands. In an embodiment, conductor strands comprise 27 AWG strands. In an embodiment, conductor strands comprise copper strands having diameters measuring, on average, 0.16 mm (34 AWG, or 0.16 AS). In other embodiments, copper strands comprise other diameters, including strands that have average diameters of 0.16 mm, or average diameters of approximately 0.16 mm, such as 0.16 mm+/−10%. In another embodiment, average diameters of copper strands used in a single wire 1100 range from 0.15 mm to 0.16 mm, or in another embodiment 0.25 mm+/−10%. In decorative lighting applications, a relatively wide range or tolerance in strand diameter may be sufficient due to a common practice of operating decorative light strands at currents significantly below maximum safe ampacity limits. Conductor strands 1104 may comprise copper strands complying with ASTM B 3-90 standards.

Conductor strands 1104 extend axially along Axis A, and may or may not be twisted about reinforcing strand 1102 or other conductor strands 1104.

Conductor strands 1104 may generally be cylindrical, presenting a generally circular cross section, though in other embodiments, each strand 1104 may present other cross-sectional shapes.

The number of conductor strands 1104 may vary based on a combination of factors, including desired conductive properties, and mechanical design characteristics. For example, for a 22 AWG equivalent wire, which in the decorative lighting industry may typically comprise 116 copper strands, reinforced decorative-lighting wire 1100 may also comprise 116 conductor strands. In another embodiment reinforced wire 1100 may be equivalent to 25 AWG in its current-carrying capability (maximum of 0.73 A), and may comprise 8 conductor strands, which in an embodiment comprises (8) 0.16 mm diameter strands. In other embodiments of 25 AWG equivalent wire, reinforced wire 1100 may include 8-10 conductor strands 1104; in an embodiment, each conductor strand 1104 may have a diameter averaging 0.16 mm, or alternatively, 0.157-0.154 mm.

In other embodiments of wire 1100, which in an embodiment may comprise 24 AWG equivalent wire, reinforced wire 1100 may include 8 conductor strands 1104; in an embodiment, each conductor strand 1104 may have a diameter averaging 0.16 mm, or alternatively, 0.157-0.154 mm.

In embodiments, the above configurations of strands 1104 may be combined with polymer reinforcing strands 1102 sized to fall within a range of 1000 to 1500 Denier.

The number of conductor strands 1104 may be greater or fewer than that of an equivalent wire having similar conductive properties, though it will be understood that particular embodiments of wire 1100 are intended to match the electrical or conductive properties of equivalent standard wires described by the American Wire Gauge standard, e.g., 22 AWG wire, such that even if the number of strands is not equal to the number of strands in an equivalent standard wire, the size of each conductor strand 1104 will be increased or decreased to maintain electrical equivalence. An embodiment of a reinforced decorative wire 1100 having electrical properties similar or equivalent to a 22 AWG wire will be described below to further clarify and emphasize the above.

Figure 37A:
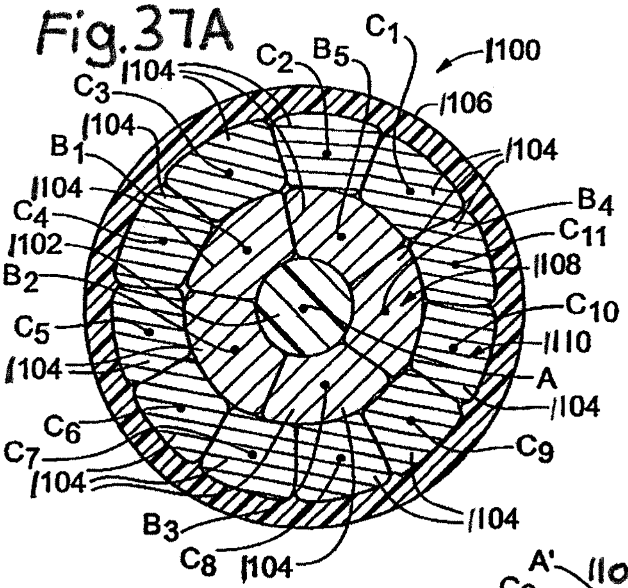
FIG. 37A is a cross-sectional view of the reinforced decorative wire of FIG. 36.
Figure 37B:
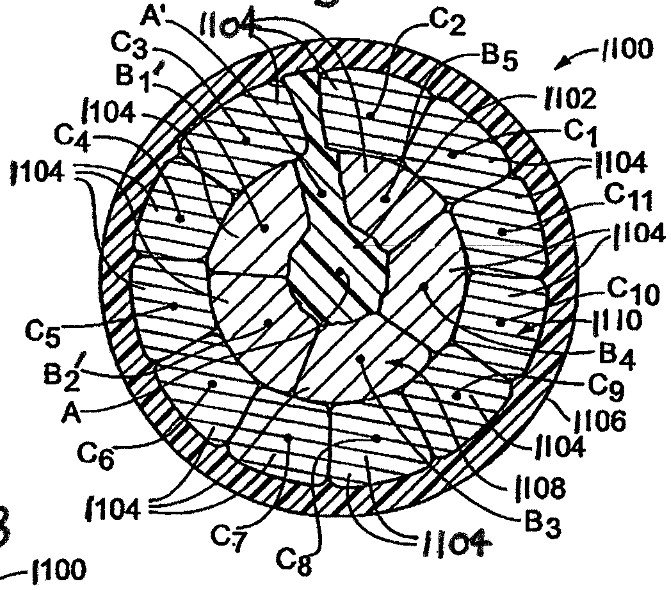
FIG. 37B is a cross-sectional view of the reinforced decorative wire of FIG. 36, depicting variations in conductor and strand position caused during manufacturing.

Referring also to FIG. 37A and FIG. 37B, in the embodiment depicted, first conductor layer 1108 is formed of multiple conductor strands 1104 twisted about centrally-positioned reinforcing fiber 1102. In the depicted embodiment, first conductor layer 1108 comprises five conductor strands 1104. In other embodiments, first conductor layer 1108 comprises more or fewer strands. In an embodiment, the number of strands 1104 in first conductor layer 1108 ranges from three strands to eight strands.

Strands 1104 extend axially along Axis A and in an embodiment, are twisted about reinforcing strand 1102. As depicted, strands 1104 are helically twisted about reinforcing strand 1102 in a counter-clockwise direction, though in other embodiments, strands 1104 may be twisted or wrapped about reinforcing wire 1102 in a clockwise direction.

Central axes of conductor strands 1104 are depicted in FIGS. 3, 4A and 4B by arrows B1'-B5 (first layer 1108) and C1-C11 (second layer 1110).

The twist or "pitch" of conductor strands 1104 may be defined by a "length of lay", or the length of conductor strand 1104 required to turn a full rotation, or turn 360 degrees. As compared to standard gauge wire having equivalent electrical properties, wire 1100 of the claimed invention may have lesser lengths of lay when the same number of conductor strands 1104 are used. For example, in an embodiment of a 22 AWG equivalent wire, a length of lay of a conductor strand 1104 of first layer 1108 is approximately 118.5 mm, as compared to approximately 32 mm for an equivalent standard 22 AWG wire commonly used for decorative lighting. The additional twists per unit of length, or decreased length of lay provides axial reinforcing strength in addition to the reinforcing strength added by reinforcing strands 1102.

Furthermore, the shorter length of lay may allow further stretching and elongation of wire 1100 without breakage when subjected to axial opposing forces, such as F1 and F2 as depicted in FIG. 36.

In an embodiment, conductor strands 1104 of layer 1108 each have an approximately equal length of lay, though in other embodiments, including some described further below, conductor strands 1104 may have different lengths of lay.

Additionally, unlike typical wires used in decorative lighting that comprise only conductive strands, i.e., no reinforcing strand, the use of one or more reinforcing strands 1102 in wire 1100 may allow for some slight radial compression of strands 1102 by conductor strands 1104 when wire 1100 is subjected to axial forces. This provides the added advantage of allowing wire 1100 to elongate even further than a typical decorative lighting wire of a similar wire gauge and ampacity.

Second conductor layer 1110 is formed on first conductor layer 1108, and also comprises a plurality of conductor strands 1104. In an embodiment, and as depicted, second conductor layer 1110 comprises eleven conductor strands 1104. In other embodiments, second conductor layer 1110 comprises more or fewer strands 1104. In an embodiment, the number of conductor strands 1104 in second layer 1110 ranges from four strands to 30 strands.

Strands 1104 extend axially along Axis A, and are adjacent strands 1104 of first layer 1108. In an embodiment, strands 1104 of second layer 1110 are adjacent to, and twisted about first layer 1108. As depicted, strands 1104 are twisted about layer 1108 and its strands 1104 in a counter-clockwise direction. As such, in an embodiment, conductor strands 1104 of second conductor layer 1110 twists in the same direction as the direction that conductor strands 1104 of second conductor layer 1108 twist. In other embodiments, strands 1104 may be twisted over layer 1108 in a clockwise direction, and may twist in a direction opposite to a twist direction of first conductor layer 1110. Strands 1104 forming conductor layer 1108 generally are positioned adjacent one another.

In an embodiment, conductor strands 1104 of layer 1110 each have an approximately equal length of lay, though in other embodiments, including some described further below, conductor strands 1104 may have different lengths of lay.

Insulating layer (or jacket) 1106 wraps about second conductive layer 1110, covering and insulating conductor strands 1104 and reinforcing strand 1102. Insulating layer 1106 may comprise any of a variety of known insulating materials, including polymers such as PVC, PE, thermoplastics, and so on. In addition to providing insulative properties, insulating layer 1106 may add mechanical strength through its other properties. In an embodiment, insulating layer 1106 has a minimum elongation percentage of 150%. In an embodiment, insulating layer 1106 comprises a polymer having a composition different than the polymer comprising reinforcing strand 1102.

Referring still to FIGS. 6, 7A and 7B, in an embodiment, wire 1100 comprises a reinforced 22 AWG-electrically-equivalent wire comprising a single reinforcing strand 1102 extending axially along a center of wire 1100, surrounded by 116 twisted conductor strands 1104, and overlaid with an insulating jacket layer 1106. The 116 conductor strands 1104 comprise first conductive layer 1108, consisting of 5 conductive strands 1104, and second conductive layer 1110, consisting of 11 conductive strands 1104. In an embodiment, reinforcing strand 1102 comprises PET material in the form of a 11500 Denier strand; conductive strands 1104 comprise primarily copper; and insulating layer 1106 comprises PVC.

Each conductive strand 1104 defines an approximately 0.16 mm diameter, circular or round wire, such that the equivalent cross-sectional area of the conductive portion of wire 1100 is approximately the same as a standard 22 AWG wire, also denoted as 116/0.16 AS, meaning 116 strands of 0.16 mm diameter conductor strands. In this embodiment, the resistivity ranges from 54 to 57 ohms/km. In an embodiment, the resistivity is 56.8 ohms/km or less. In an embodiment, the resistivity is substantially 55 ohms/km.

The length of lay, sometimes referred to as lay of strand, of each conductor strand 1104 of first layer 1108, in an embodiment is 32 mm or less. In an embodiment, the length of lay of conductor strand 1104 of first layer 1108 ranges from 15 mm to 25 mm. In an embodiment, the length of lay of conductor strands 1104 of first layer 1108 is approximately 18.5 mm. In an embodiment the length of lay of all conductor strands 1104 of first layer 1108 are approximately the same. In an embodiment, a lineal length of each strand per unit length is within 5% of an average lineal length (note: the lineal length of a strand will be longer than a unit length due to the helical twisting of a wire, e.g., a 1 foot length of wire 1100 will include strands 1104 having lineal lengths longer than 1 ft. In other embodiments, the lineal length of individual strands 1104 may vary more substantially per unit length of wire 1100, particularly when lengths of lay of individual strands 1104 are allowed to vary from strand to strand.

The length of lay of conductor strands 1104 of second conductive layer 1110 may be the same as conductor strands 1104 of first conductor layer 1108, or in some embodiments, may be different. In an embodiment a length of lay of conductor strands 1104 of second layer 1110 is 32 mm or less. In an embodiment, the length of lay of conductor strand 1104 of second layer 1110 ranges from 15 mm to 25 mm. In an embodiment, the length of lay of conductor strands 1104 of second layer 1110 is substantially 18.5 mm. In an embodiment, lengths of lay of conductor strands 1104 of both layers 1108 and 1110 are, on average, approximately 18.5 mm. In an embodiment, the direction of twisting is the same, as depicted in FIG. 36.

In an embodiment, including an embodiment of 22 AWG reinforced wire 1100, insulation layer 1106, comprising primarily PVC material, has a minimum thickness of 0.69 mm. In an embodiment, insulation 1106 comprises a thickness ranging from 0.69 mm to 1.0 mm. In an embodiment, an average thickness of insulating layer 1106 has an average thickness of 0.76 mm or greater. In one such embodiment, insulating layer 1106 has an average thickness of 0.84. In an embodiment insulating layer 1106 has an insulation resistance of at least 225 MΩ/Kft.

In an embodiment, the overall diameter of wire 1100 in 22 AWG ranges from 2.40 to 2.70 mm. In an embodiment, an average overall diameter is approximately 2.6 mm; in an embodiment, an average overall wire 1100 diameter is 101 mil.

With respect to elongation, in an embodiment, wire 1100 has an elongation of 150% or greater. In an embodiment, the elongation of wire 1100 ranges from 150% to 400%. In one embodiment, wire 1100 exhibits 300% elongation, significantly longer than standard, all-copper multi-stranded 22 AWG CXTW wire.

With respect to tensile strength, embodiments of wire 1100 have an improved tensile strength, which in one embodiment includes a tensile strength of 1,500 PSI or greater. In an embodiment, the tensile strength ranges from 1,500 PSI to 4,000 PSI, in another embodiment, the tensile strength ranges from 2,500 to 3,500 PSI. Such a range may provide sufficient strength for various decorative lighting applications, including trees, net lights, sculptures, and so on. In some applications where wires are affixed tightly to supporting structure, such as trees of metal frames, a required tensile strength may be on the lower end of the range, while wires of light strings that are not affixed to, or are less supported, may require higher tensile strength due to possible pulling or yanking by a user.

Another method of describing and measuring "strength" of a wire, including a reinforced wire 1100, and as commonly used in decorative lighting is to measure an axially-applied pulling force required to cause the wire to begin to break, such that an outer insulation shows breakage, or an inner conductor shows breakage. In an embodiment, reinforced wire 1100 may withstand axial pulling forces of various ranges depending on the particular reinforced wire 1100 configuration.

In an embodiment, reinforced wire 1100 may withstand a minimum axially-applied pulling force ranging from 22 lbf to 46 lbf. In one such embodiment, reinforced wire 1100 comprises an ampacity equivalent to a 22 AWG wire, and can withstand a minimum 22.4 lbf without breaking; in another embodiment, reinforced wire 1100 comprises an ampacity equivalent to a 20 AWG wire, and can withstand a minimum 30 lbf without breaking; in another embodiment, reinforced wire 1100 comprises an ampacity equivalent to a 18 AWG wire, and can withstand a minimum 46 lbf without breaking.

In another embodiment, reinforced wire 1100 comprises 7-10 conductor strands 1104 defining a range of minimum axial pulling force ranging from 22.4 lbf to 46 lbf. In one such embodiment, reinforced wire 1100 comprises 8 conductor strands and has a minimum axial pulling force at breakage of 46 lbf; in one such embodiment, each conductor strand 1104 may have an average diameter in the range of 0.15 mm to 0.17 mm; alternatively, each conductor strand 1104 may have an average diameter of 0.154 mm to 0.157 mm. Such ranges accommodate expected current flows in various decorative lighting applications, while offering substantial overall tensile strength.

In an embodiment, wire 1100 includes a 1500 Denier PET reinforcing strand 1102 extending axially along Axis A, 16 copper conductor strands of 0.16 mm average diameter (5 first layer 1108 strands and 11 second layer 1110 strands) having a 55 Ω/km resistivity, and insulating layer 1106 of PVC material. In one such embodiment, elongation is greater than 300% (in an embodiment is 306%), with a tensile strength of 2800 PSI, requiring a force of approximately 21 kg to break. Such a wire may be used as a substitute for standard 22 AWG wire, including 22 AWG CXTW wire for improved decorative-lighting applications.

Referring to FIG. 37B, the wire 1100 of FIGS. 36 and 37A is depicted again, but in this case, the configuration of wire 1100, namely the relative positions of conductor strands 1104 and reinforcing strand 1102, are somewhat different. In an embodiment, because of the malleable properties of reinforcing strand 1102, including the fibrous nature, pliability, and so on, during manufacturing of wire 1100, reinforcing strand 1102 may be deformed somewhat, which in turn, may cause first and second layer strands 1108 and 1110 to move relative to one another, and relative to reinforcing strand 1102. As depicted in FIG. 37B, at a particular cross section, reinforcing strand 1102 does not comprise a circular cross section, but rather, comprises another shape due to deformation. Such "deformation", may actually be the result of radial displacement of individual strands or fibers of reinforcing strand 1102 that occur when layers of conductor strands 1104 are wound or twisted about generally central reinforcing strand 1102. Such variation, may be caused by radial movement or deformation of reinforcing strand 1102 and may vary axially, or along a length of wire 1100. Consequently, while FIG. 37A depicts an ideal embodiment of wire 1100 in cross section, in other embodiments wire 1100 may comprise the relative structure depicted in FIG. 37B, or some other similar structure. As such, embodiments of reinforced decorative wire 1100 may include a central reinforcing strand that may only be substantially, or mostly centrally located. Further, in such an embodiment, conductor strands 1104 may not be evenly spaced about reinforcing strand 1102, as depicted, nor will strands 1104 of layer 1110 be evenly spaced about layer 1108.

As described above, embodiments of wire 1100 are not limited to the 1-5-11 configuration described above (1 reinforcing strand 1102, 5 first layer conductors 1105 and 11 second layer conductors 1110).

Although embodiments of reinforced wire 1100 may comprise multi-layer conductor strand embodiments, such as those depicted in FIGS. 36-37B, embodiments of reinforced wire 1100 may include only a single layer of conductor strands 1104 and a single reinforcing strand 1102. Some such embodiments will be further described below, and may include the following embodiments: 10 conductor strands 1104 with a single reinforcing strand 1102, which in an embodiment includes 0.15-0.16 mm diameter strands 1104 and 1000 Denier strand 1102; 9 conductor strands 1104 with a single reinforcing strand 1102, which in an embodiment includes 0.15-0.16 mm diameter strands 1104 and 1000 Denier strand 1102; 8 conductor strands 1104 with a single reinforcing strand 1102, which in an embodiment includes 0.15-0.16 mm diameter strands 1104 and 1500 Denier strand 1102; and 7 conductor strands 1104 with a single reinforcing strand 1102, which in an embodiment includes 0.15-0.16 mm diameter strands 1104 and 1500 Denier strand 1102. In some such 7, 8, 9, or 110 stranded embodiments, when fewer conductor strands 1104 are used, a larger diameter and stronger reinforcing strand 1102 may be included to make up for the decrease in tensile strength due to fewer conductor strands 1104.

Figure 38:
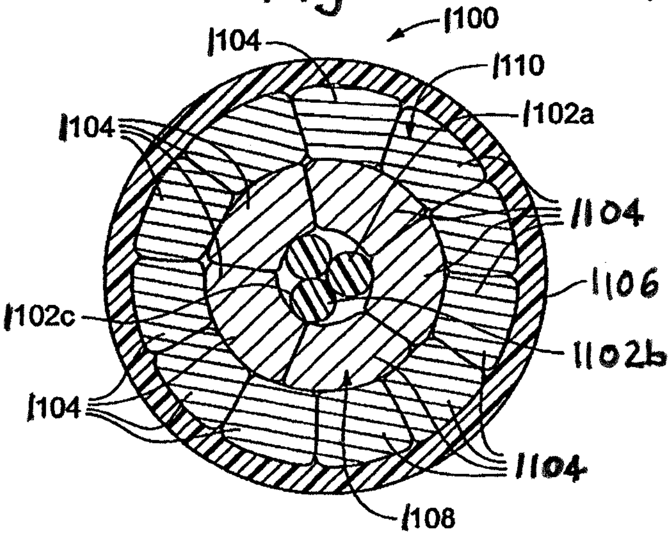
FIG. 38 is a cross-sectional view of another embodiment of a reinforced decorative wire, according to an embodiment of the claimed invention.

Referring to FIG. 38, another embodiment of reinforced decorative-lighting wire 1100 is depicted. This alternate embodiment of wire 1100 is substantially the same as the embodiment depicted in FIGS. 36, 37A and 37B, and described above, with the exception of reinforcing strands 1102. In this embodiment, rather than a single reinforcing strand 1102, wire 1100 includes three reinforcing strands 1102*a*, 1102*b*, and 1102*c*. Reinforcing strands 1102*a*-102*c* extend axially through the center portion of wire 1102. Strands 1102*a*-102*c* may or may not be twisted about one another. Twisting multiple strands 1102 may provide an additional reinforcing strength.

In an embodiment, fewer than three strands 1102, namely two strands may be used. In other embodiments, greater than three strands 1102 may be used.

In an embodiment, the cross-sectional area of the three reinforcing strands 1102*a*, 1102*b*, and 1102*c* is equivalent to the 1500 Denier strand described above with respect to the embodiment of FIGS. 36, 37A and 37B. In other embodiments, the size of reinforcing strands 1102 may be larger or smaller, depending on desired wire 1100 strength, with larger size strands and/or more strands 1102 being used for stronger reinforced wire 1100.

Figure 39:
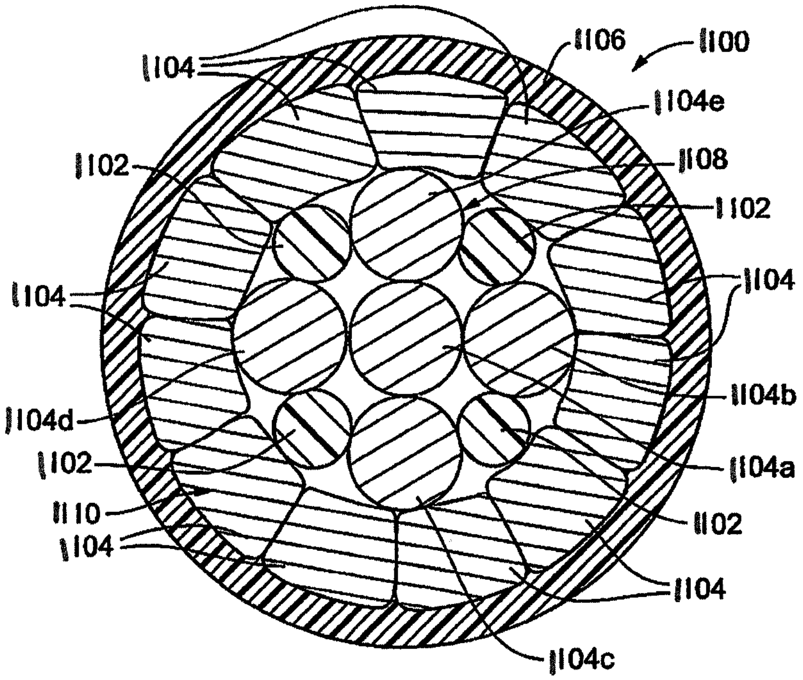
FIG. 39 is a cross-sectional view of another embodiment of a reinforced decorative wire, according to an embodiment of the invention.

Referring to FIG. 39, another embodiment of wire 1100 is depicted. In this embodiment, wire 1100 still includes multiple reinforcing strands 1102, first conductor layer 1108 comprising multiple conductors 1104, second conductor layer 1110 comprising multiple conductors 1104, and outer insulating layer 1106. In the depicted embodiment, first conductor layer 1108 includes five conductors 1104 and second conductor layer 1110 includes eleven conductors 1104, similar to the embodiments described above with respect to FIGS. 36-38. However, in this embodiment, wire 1100 includes four reinforcing strands 1102.

As depicted, first conductor layer 1108 actually includes a single, central conductor 1104*a* surrounded by four outer conductors 1104*b*, 1104*c*, 1104*d*, and 1104*e*. Between each outer conductor 1104*b*, 1104*c*, 1104*d* and 1104*f* is a reinforcing strand 1102. Second conductor layer 1110 is adjacent both the four conductors 1104*b*-*e*, and the four reinforcing strands 1102.

Embodiments of the invention are not intended to be limited to the specific patterns and structures depicted in FIGS. 36-39. It will be understood that the number of conductors 1104, number of reinforcing strands 1102, and their combinations, may vary.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A tangle-resistant decorative lighting assembly, comprising:

a main portion including a plurality of internally-reinforced decorative-lighting wires and a plurality of lighting assemblies, the plurality of lighting assemblies mechanically and electrically connected to the plurality of internally-reinforced decorative-lighting wires, a power cord portion including a power plug electrically connected to a first power wire and a second power wire, the first power wire and the second power wire electrically connected to the main portion, each of the first power wire and the second power wire comprising internally-reinforced decorative-lighting wires;

wherein each of the plurality of internally-reinforced decorative-lighting wires of the main portion, and the internally-reinforced decorative-lighting wires of the power cord has a plurality of conductive strands helically wound together at a central portion of the internally-reinforced decorative lighting wire and in contact with an outer insulation portion of the internally-reinforced decorative-lighting wire, and has a plurality of polymer reinforcing strands, each in contact with the outer insulation portion.

2. The tangle-resistant decorative-lighting assembly of claim 1, wherein the main portion further includes one or more mechanical support cords connected to the plurality of lighting assemblies.

3. The tangle-resistant decorative-lighting assembly of claim 2, wherein none of the mechanical support cords are in electrical connection with the lighting assemblies.

4. The tangle-resistant decorative-lighting assembly of claim 3, wherein the one or more mechanical support cords are solid-strand cords.

5. The tangle-resistant decorative-lighting assembly of claim 2, wherein the one or more mechanical support cords and internally-reinforced decorative-lighting wires cooperate to form a net-like structure.

6. The tangle-resistant decorative-lighting assembly of claim 5, wherein each of the one or more mechanical support cords is mechanically joined to a lighting assembly of the plurality of lighting assemblies.

7. The tangle-resistant decorative-lighting assembly of claim 6, wherein the one or more mechanical support cords comprises two or more mechanical support cords, and each mechanical support cored of the two or more mechanical support cords is mechanically connected to a multiple lighting assemblies of the plurality of lighting assemblies.

8. The tangle-resistant decorative-lighting assembly of claim 6, wherein each of the one or more mechanical support cords is mechanically joined to multiple lighting assemblies of the plurality of lighting assemblies.

9. The tangle-resistant decorative-lighting assembly of claim 1, wherein the plurality of conductive strands of each of the internally-reinforced decorative-lighting wire forms a 22 American Gauge Wire (AWG) conductor.

10. The tangle-resistant decorative-lighting assembly of claim 2, wherein the plurality of conductive strands of each of the internally-reinforced decorative-lighting wire forms a 22 American Gauge Wire (AWG) conductor.

11. A tangle-resistant decorative-lighting assembly forming a generally rectangular shape with four sides and four corners, comprising:

a power plug;

a pair of power wires electrically connected to the power plug, including a first internally-reinforced power wire and a second internally-reinforced power wire, the first internally-reinforced power wire including a plurality of conductor strands positioned at a central portion of the first internally-reinforced power wire, a plurality of reinforcing strands, and an outer insulation layer, and the second internally-reinforced power wire including a plurality of conductor strands positioned at a central portion of the second internally-reinforced power wire, a plurality of reinforcing strands, and an outer insulation layer;

a plurality of internally-reinforced intermediate wires in electrical connection with the power wires and the power plug, each of the plurality of internally-reinforced intermediate wires including a plurality of conductor strands positioned at a central portion of the internally-reinforced intermediate wire, a plurality of reinforcing strands, and an outer insulation layer;

a plurality of lighting assemblies in electrical connection with the plurality of internally-reinforced intermediate wires;

one or more mechanical support cords mechanically connected to the plurality of lighting assemblies, which in cooperation with the intermediate wires forms the generally rectangular shape with the four sides and four corners;

wherein a first side of the generally rectangular shape extends between the first corner and a second corner and is formed by a portion of one or both of the first and second power wires, and a second side of the generally rectangular shape extends between the first corner and a third corner and is formed by one or more of the mechanical support cords.

12. The tangle-resistant decorative-lighting assembly of claim 11, wherein the power plug is located adjacent to the first corner.

13. The tangle-resistant decorative-lighting assembly of claim 11, wherein the plurality of conductive strands of each of the power wires and internally-reinforced intermediate wires forms a 22 American Gauge Wire (AWG) conductor.

14. The tangle-resistant decorative-lighting assembly of claim 11, wherein each of the plurality of internally-reinforced intermediate wires extends between a pair of lighting assemblies, and is electrically and mechanically connected to the pair of lighting assemblies.

15. The tangle-resistant decorative-lighting assembly of claim 14, wherein each lamp assembly of the plurality of lamp assemblies is mechanically connected to at least one mechanical support cord of the plurality of mechanical support cords and at least one of the plurality of internally-reinforced intermediate wires.

16. The tangle-resistant decorative-lighting assembly of claim 11, wherein the plurality of lighting assemblies and the plurality of internally-reinforced intermediate wires form a first and a second electrical circuit, and none of the mechanical support cords are in electrical connection with the first or the second electrical circuit.

17. The tangle-resistant decorative-lighting assembly of claim 16, wherein the first electrical circuit is electrically connected to the second electrical circuit in parallel.

18. The tangle-resistant decorative-lighting assembly of claim 17, wherein the first electrical circuit includes multiple lighting assemblies of the plurality of lighting assemblies, the multiple lighting assemblies electrically connected to one another in series.

19. The tangle-resistant decorative-lighting assembly of claim 11, wherein each reinforcing strand of the plurality of reinforcing strands comprises a polymer material.

20. The tangle-resistant decorative-lighting assembly of claim 19, wherein each reinforcing strand of the plurality of reinforcing strands includes a plurality of reinforcing fibers to form a yarn of multiple fibers.

* * * * *